(12) United States Patent
Allen

(10) Patent No.: US 10,526,729 B2
(45) Date of Patent: Jan. 7, 2020

(54) MELT BLOWING DIE, APPARATUS AND METHOD

(71) Applicant: NANOFIBER, INC., Gainesville, GA (US)

(72) Inventor: Martin Anthony Allen, Denver, CO (US)

(73) Assignee: NanoFiber, Inc., Gainesville, GA (US)

( * ) Notice: Subject to any disclaimer, the term of this patent is extended or adjusted under 35 U.S.C. 154(b) by 409 days.

(21) Appl. No.: 15/120,597

(22) PCT Filed: Feb. 13, 2015

(86) PCT No.: PCT/US2015/015913
§ 371 (c)(1),
(2) Date: Aug. 22, 2016

(87) PCT Pub. No.: WO2015/126761
PCT Pub. Date: Aug. 27, 2015

(65) Prior Publication Data
US 2017/0067184 A1    Mar. 9, 2017

Related U.S. Application Data

(60) Provisional application No. 61/943,868, filed on Feb. 24, 2014.

(51) Int. Cl.
| | |
|---|---|
| *D01D 4/02* | (2006.01) |
| *D01D 5/098* | (2006.01) |
| *D01D 5/14* | (2006.01) |
| *B29C 47/30* | (2006.01) |
| *B29C 47/06* | (2006.01) |
| *B29C 47/08* | (2006.01) |

(Continued)

(52) U.S. Cl.
CPC ............. *D01D 4/025* (2013.01); *B29C 48/05* (2019.02); *B29C 48/1472* (2019.02);
(Continued)

(58) Field of Classification Search
CPC ............ D01D 4/025; D01D 5/14; D01D 4/06; D01D 5/0985; D01D 4/027; B29C 48/21;
(Continued)

(56) References Cited

U.S. PATENT DOCUMENTS 2,031,387 A    2/1936 Schwarz
3,204,290 A    9/1965 Crompton
(Continued)

*Primary Examiner* — Robert J Grun
(74) *Attorney, Agent, or Firm* — Marsh Fischmann & Breyfogle LLP

(57) ABSTRACT

A melt blowing die includes a stack of plates including corresponding melt blowing die tip, die body and air functionalities. One or more rows of polymer filament extrusion orifices extend through in a stack direction across multiple plates of a stack. A gas distribution system within the stack has gas outlets are positioned to provide distributed gas flow to contact and attenuate extruded polymer filaments. One of more polymer distribution channels extend longitudinally through multiple plates in the stack direction to supply polymer to each of the rows of extrusion orifices. A polymer distribution channel is open to receive polymer feed only at a longitudinal end. A melt blowing apparatus has a collection substrate movable in a machine direction that is transverse to a stack direction in a melt blowing die. A method for producing fiber-containing material includes melt blowing using a melt blowing die with a stack of plates.

33 Claims, 14 Drawing Sheets

(51) Int. Cl.
*B29C 47/10* (2006.01)
*D01D 4/06* (2006.01)
*B29C 47/00* (2006.01)
*B29C 48/05* (2019.01)
*B29C 48/21* (2019.01)
*B29C 48/29* (2019.01)
*B29C 48/30* (2019.01)
*B29C 48/345* (2019.01)
*B29C 48/14* (2019.01)

(52) U.S. Cl.
CPC .............. *B29C 48/21* (2019.02); *B29C 48/29* (2019.02); *B29C 48/30* (2019.02); *B29C 48/3001* (2019.02); *B29C 48/345* (2019.02); *D01D 4/06* (2013.01); *D01D 5/0985* (2013.01); *D01D 5/14* (2013.01)

(58) Field of Classification Search
CPC ..... B29C 48/1472; B29C 48/30; B29C 48/29; B29C 48/05; B29C 48/345; B29C 48/3001
See application file for complete search history.

(56) References Cited

U.S. PATENT DOCUMENTS

| | | |
|---|---|---|
| 5,618,566 A | 4/1997 | Allen et al. |
| 5,679,379 A | 10/1997 | Fabbricante et al. |
| 5,728,219 A | 3/1998 | Allen et al. |
| 5,882,573 A | 3/1999 | Kwok et al. |
| 5,902,540 A | 5/1999 | Kwok |
| 5,904,298 A | 5/1999 | Kwok et al. |
| 6,051,180 A | 4/2000 | Kwok |
| 6,074,597 A | 6/2000 | Kwok et al. |
| 6,114,017 A | 9/2000 | Fabbricante et al. |
| 6,197,406 B1 | 3/2001 | Kwok |
| 6,200,635 B1 | 3/2001 | Kwok |
| 6,210,141 B1 | 4/2001 | Allen |
| 6,422,848 B1 | 7/2002 | Allen et al. |
| 6,461,430 B1 | 10/2002 | Kwok |
| 6,602,554 B1 | 8/2003 | Kwok |
| 6,680,021 B1 | 1/2004 | Kwok et al. |
| 7,033,153 B2 | 4/2006 | Allen et al. |
| 7,033,154 B2 | 4/2006 | Allen et al. |
| RE39,399 E | 11/2006 | Allen |
| 7,504,131 B2 | 3/2009 | deLeon et al. |
| 7,798,434 B2 | 9/2010 | Bondeson et al. |
| 8,226,391 B2 | 7/2012 | Fork et al. |
| 8,399,053 B2 | 3/2013 | Bondeson et al. |
| 8,408,889 B2 | 4/2013 | Schutt et al. |
| 8,435,600 B2 | 5/2013 | Burmester et al. |
| 8,535,756 B2 | 9/2013 | Bondeson et al. |
| 2005/0003035 A1 | 1/2005 | Zucker et al. |
| 2005/0242108 A1 | 11/2005 | Harris et al. |
| 2006/0217000 A1 | 9/2006 | Zucker et al. |
| 2010/0199955 A1 | 8/2010 | Smith |
| 2013/0084388 A1 | 4/2013 | Budai et al. |
| 2013/0266874 A1 | 10/2013 | Matsubara et al. |

MELT BLOWING DIE, APPARATUS AND METHOD

CROSS-REFERENCE

This application claims the benefit of U.S. Provisional Patent Application No. 61/943,868 entitled "Melt Blowing Die, Apparatus and Method", filed Feb. 24, 2014, the entire contents of which are incorporated herein by reference.

FIELD OF THE INVENTION

This disclosure relates to melt blowing dies, melt blowing apparatuses including melt blowing dies and methods involving melt blowing using a melt blowing die.

BACKGROUND OF THE INVENTION

Melt blowing is a technique for forming fine diameter fibers from materials such as thermoplastic polymers, for example to prepare nonwoven material or to deposit adhesives. The technique conventionally involves extruding a thermoplastic material from a row of extrusion orifices extending along the lower edge of a melt blowing die. High velocity gas, typically air, is impinged on extruded polymer filaments exiting the extrusion orifices to attenuate the filaments and form small diameter filaments, or fibers. Conventional melt blown fibers are often 3-5 microns in diameter.

The melt blowing die, also referred to as a die assembly, conventionally includes a die tip (also referred to as a spinneret) that has extrusion orifices from which polymer melt is extruded and narrow extrusion channels that deliver polymer melt to the extrusion orifices. The die assembly also includes a die body, which is often in two halves, designed to distribute polymer uniformly to all extrusion orifices along the die tip. The die assembly also includes air plates on either side of the die tip to direct air to contact polymer extruding from the die tip and air manifolds for supplying air to the air plates. The die tip and die body halves are conventionally each made from large, single pieces of steel machined with necessary geometric features. The separate die tip and die body halves must then be assembled together to provide all of the necessary functionalities for an operable melt blowing die.

One problem with conventional melt blowing die assemblies is the difficulty of machining to prepare required fine geometries in large metal work pieces, which presents a significant practical limitation on the number and intricacy of geometries that can be included. Also, making such large machined pieces so that all necessary features precisely align and join when assembled into the final die assembly is difficult and expensive.

Some proposals have been made to use a plate assembly structure for one or more components of a die assembly, for example to make a die body in the form of a plate assembly that may mate with a separate die tip or a die tip in the form of a plate assembly that may mate with a separate die body. Utilizing a plate structure permits machining features in the smaller work pieces of the plates, reducing the need to machine large pieces. However, such proposed designs incorporating a plate structure still include separate pieces or subassemblies for corresponding die body, die tip and/or air functionalities that must be designed to match for a particular melt blowing die configuration and must be precisely aligned and joined together to operate for the particular design.

SUMMARY OF THE INVENTION

Corresponding die body, die tip and air functionalities for a melt blowing die may be included within a single stack of plates, without requiring assembly of separate pieces or subassemblies each devoted to different ones of those functionalities. Great flexibility is provided to construct melt blowing die segments in the form of a stack structure that includes all of these corresponding functionalities for the die segment. Such a stack may be made of varying length without having to separately design matching pieces or subassemblies for the different melt blowing die functionalities to accommodate the varying lengths. Corresponding die body, die tip and air functionalities for a die segment self-assemble with stacking of the plates to form the stack structure. Multiple such stack structures may be arranged longitudinally in a melt blowing die to provide further flexibility to prepare melt blowing dies of a variety of lengths and configured for a variety of melt blowing applications. In a first aspect of the disclosure a melt blowing die may comprise at least one stack of plates stacked in a stack direction. The stack of plates includes:

polymer filament extrusion orifices including at least one row of extrusion orifices extending in the stack direction across multiple said plates of the stack;

a gas distribution system within the stack including gas outlets positioned to provide distributed gas flow to contact and attenuate polymer filaments extruded from such extrusion orifices of each such row of extrusion orifices; and at least one polymer distribution channel extending longitudinally through multiple plates of the stack in the stack direction, the polymer distribution channel being in fluid communication within the plate stack for supply of polymer to the extrusion orifices of at least one such row of extrusion orifices.

Each such polymer distribution channel is open to receive polymer feed only at a longitudinal end of the polymer distribution channel. Accordingly, polymer fed to the distribution channel must travel longitudinally down the polymer distribution channel to provide polymer to all of the extrusion orifices within each row of extrusion orifices fed by the polymer distribution channel.

In a second aspect of the disclosure, a melt blowing apparatus is provided that includes a melt blowing die (such as of the first aspect of the disclosure); a collection substrate positioned relative to the extrusion orifices of the melt blowing die and moveable relative to the melt blowing die in a machine direction to collect attenuated polymer filaments, or fibers, produced from the melt blowing die when operated for a melt blowing operation; and wherein the stack direction of the stack of plates is transverse to the machine direction.

In a third aspect of this disclosure, a method is provided for producing fiber-containing materials. The method may include:

feeding a polymer feed to a melt blowing die;

distributing different portions of the polymer feed to extrusion orifices of the melt blowing die;

extruding polymer filaments from the such extrusion orifices; and attenuating extruded polymer filaments from such extrusion orifices with gas flow from gas outlet openings of the melt blowing die directed to contact the extruded polymer filaments from the extrusion orifices.

The melt blowing die of the method may comprise at least one stack of plates stacked in a stack direction. Such a stack of plates may comprise:

at least a portion of the extrusion orifices that includes at least one row of extrusion orifices extending in the stack direction across multiple plates of the stack and at least a portion of the gas outlet openings that correspond with such at least one row of extrusion orifices;

at least one polymer distribution channel extending longitudinally through multiple plates of the stack in the stack direction, wherein each such row of extrusion orifices is in fluid communication with a such polymer distribution channel; and a gas distribution system through which gas flow is distributed to the at least a portion of the gas outlet openings.

The distributing comprises introducing at least a portion of the polymer feed into each such polymer distribution channel only through a longitudinal end of each said polymer distribution channel.

A number feature refinements and additional features are applicable to any or all of these or other aspects of this disclosure. Such feature refinements and additional features may be used individually or in any combination and with any one or more aspects of the disclosure. As such, each of the following features may be, but are not required to be, used with any other feature or combination of features of the same or any other aspect or aspects of the disclosure.

Each extrusion orifice of a row of extrusion orifices in a stack may be in fluid communication with a polymer distribution channel in the stack through a separate polymer passage between the polymer distribution channel and the respective extrusion orifice. In some implementations, such as for example adhesive applications, valve mechanisms may be provided to permit the flow of polymer through the polymer passages to be turned on and off for intermittent operation of the melt blowing die. Such a valve in the polymer passage may be manipulable between open and closed positions to permit and prevent polymer flow through the polymer passage to the corresponding extrusion orifice that is fed polymer via that polymer passage. All valves corresponding with a row of extrusion orifices may be disposed in a row that extends through the stack in the stack direction. All valves that correspond with extrusion orifices of a row may be connected with a single actuation member that is manipulable to simultaneously reposition all of the valves corresponding with that row between open and closed positions. Such manipulation may, for example, involve longitudinal translation of such an actuation member to slide valve mechanisms into and out of position to open and close the polymer passages. For example, the valve mechanisms may have a disk or spool arrangement that corresponds with geometry of the polymer passage. As another example, the actuation member may be rotatable to reposition valves between open and closed positions. Rotation of the actuation member may rotatably reposition an aperture or recess area in a valve member to permit polymer to flow through the polymer passage or to block flow of polymer through the polymer passage. When the stack includes two or more rows of extrusion orifices, the melt blowing die may include a separate row of valves corresponding with each row of extrusion orifices, and each of the different row of valves may be connected with and manipulable by a separate actuation member. Each row of valves may, therefore, advantageously be manipulated by a single solenoid that may affect manipulation of an actuation member to simultaneously reposition all valves of a row between open and closed positions. Similar valving may be provided in relation to permitting or blocking gas flow through a row of gas passages from a gas distribution channel to a corresponding row of gas openings.

For some implementations, it may be preferred that each polymer distribution channel in a stack has a cross-section transverse to the stack direction that tapers in the stack direction moving away from a longitudinal end of the polymer distribution channel that receives polymer feed. Such a polymer distribution channel may have a tapering shape that provides substantially equal residence time for polymer flow through the polymer distribution channel to each of the extrusion orifices fed by the polymer distribution channel, including residence time in a polymer passage between the polymer distribution channel and the polymer orifices. The taper may involve a cross-section of the polymer distribution channel that becomes progressively smaller with each plate in succession in the stack direction through which the polymer distribution channel extends from a feed end of the polymer distribution channel. A stack may include many plates through which each polymer distribution channel extends longitudinally. For example, in some implementations a polymer distribution channel may extend longitudinally through at least 10, at least 100, at least 500 or even at least 1000 plates or more in the stack direction. A polymer distribution channel may extend longitudinally over a length of the stack in the stack direction for a significant distance, to feed a significant number of extrusion orifices spaced along the stack in one or more rows. For example, a polymer distribution channel may extend longitudinally over a length of the stack of at least 1.5 centimeters, at least 5 centimeters, at least 10 centimeters, at least 50 centimeters or even at least 1 meter or more in the stack direction. In some implementations the polymer distribution channel may extend longitudinally through the extra length of the stack. In some other implementations, the polymer distribution channel may be closed off by a terminal plate of the stack.

Each polymer distribution channel in a stack will be in fluid communication to provide polymer to at least one row of extrusion orifices. A polymer distribution channel may be dedicated to supplying polymer to only a single row of extrusion orifices, or a polymer distribution channel may supply multiple rows of polymer extrusion orifices, such as two or more rows. Each row of extrusion orifices fed by a polymer distribution channel may include many extrusion orifices. The number of extrusion orifices in a row within a stack fed by a polymer distribution channel may be at least 10 extrusion orifices, at least 100 extrusion orifices, at least 250 extrusion orifices, at least 500 extrusion orifices or even at least 1000 extrusion orifices or more. The stack may include multiple polymer distribution channels (two or more polymer distribution channels) with each polymer distribution channel being in fluid communication to supply polymer to one or more than one rows of extrusion orifices.

The extrusion orifices of a row may be configured (e.g., sized and spaced) for extrusion of polymer filaments of any desired width and density. The width, or diameter, of polymer filaments will be a function of the maximum cross-dimension of the extrusion orifices. In a case of an extrusion orifice having a circular shape, the polymer filament as extruded will have a circular cross-section and the maximum cross-dimension of the extrusion orifice will be equal to the diameter of the circular shape of the extrusion orifice. In the case of an extrusion orifice having a rectangular, square, trilobal or other shape, the maximum cross-dimension of the extrusion orifice may be equal to a diagonal across the shape. For many applications, the extrusion orifices in a row may have a maximum cross-dimension in a range having a lower limit of 0.01 millimeter, 0.05 millimeter, 0.1 millimeter, 0.15 millimeter or 0.2 millimeter and an upper limit of 3 millimeters, 2 millimeters, 1.5 millimeters, 1 millimeter, 0.5 millimeter, 0.35 millimeter, 0.3 millimeter, 0.25 millimeter, 0.2 millimeter or 0.15 millimeter, provided that the upper limit is larger than the lower limit. For some nonwoven applications, the extrusion orifices in a row may have a maximum cross-dimension of not larger than 0.3 millimeter, not larger than 0.2 millimeter or not larger than 0.15 millimeter. For many adhesive applications, the cross-dimension of the orifices may often be larger than for many nonwoven applications. For some adhesive applications, the extrusion orifices in a row may have a maximum cross-dimension of at least 0.4 millimeter at least 0.25 millimeter or at least 0.7 millimeter. Extrusion orifices in a row may be spaced at any desired distance from each other for the particular application. In some implementations, the extrusion orifices in a row may have a center-to-center spacing in a range having a lower limit of 0.05 millimeter, 0.1 millimeter, 0.15 millimeter, 0.25 millimeter, 0.5 millimeter or 0.75 millimeter and an upper limit of 1.5 millimeters, 1 millimeter, 0.5 millimeter, 0.4 millimeter or 0.3 millimeter, provided the upper limit is larger than the lower limit. Desired spacing may often be closer for nonwoven applications. For some nonwoven applications center-to-center spacing of extrusion orifices in a row may be not greater than 0.5 millimeter, not greater than 0.4 millimeter or not greater than 0.3 millimeter. For some adhesive applications, the extrusion orifices of a row may have a center-to-center spacing of at least 0.25 millimeter, at least 0.5 millimeter or at least 0.75 millimeter.

The plate structure of the stack permits for inclusion of one or multiple rows of extrusion orifices with tight spacing between extrusion orifices within each row. The combination of possibility of multiple rows plus tight orifice spacing within each row permits the stack to include a very high density of extrusion orifices per unit length of the stack. When reference is made to the length of the stack, it is to the longitudinal dimension of the stack in the stack direction. In some implementations, the stack may include only a single row of extrusion orifices. In other implementations, the stack may include at least 2 rows of extrusion orifices, at least 3 rows of extrusion orifices, at least 4 rows of extrusion orifices, at least 6 rows of extrusion orifices, at least 8 rows or at least 10 rows. In some implementations, the stack may include not more than 20 rows of orifices, not more than 15 rows of orifices, not more than 10 rows of extrusion orifices, not more than 8 rows of extrusion orifices or not more than 6 rows of extrusion orifices. In some implementations, the stack may include a number of extrusion orifices (contained in all rows of extrusion orifices) per centimeter of length of the stack that is at least 0.5, at least 1, at least 5, at least 10, at least 50, at least 100, at least 500 or even at least 1000 or more. For some implementations, the number of extrusion orifices per centimeter of length of the stack may be not more than 4,000, not more than 1,000, not more than 500, not more than 100, not more than 50, not more than 10, not more than 5 or not more than 3. For many nonwoven applications, it is often desirable to have a high density of extrusion orifices. For many adhesive applications, a lower density of extrusion orifices may be desired.

The plate construction provides significant flexibility to prepare stacks of varying lengths and with varying geometries and densities of extrusion orifices and gas openings. Plates may be fabricated with a larger thickness to accommodate larger spacing of orifices in a row, while thinner plates may be used to easily reduce orifice spacing. Density of extrusion orifices may be significantly increased by using plates that include geometric features corresponding with multiple rows of extrusion orifices. In some implementations, the stack may include at least 4, at least 6, at least 8, at least 10, at least 12, at least 20, at least 30, at least 50, at least 75 or at least 100 plates per centimeter of length in the stack. For many implementations, the stack may include not more than 200, not more than 150, not more than 100, not more than 60 or not more than 40 plates per centimeter of length of the stack. For many nonwoven applications it may be desirable to have thinner plates corresponding with closer spacing of extrusion orifices. For some nonwoven applications, the stack may include at least 20, at least 40 or at least 60 plates per centimeter of length of the stack. For many adhesive applications, a greater spacing between extrusion orifices may be desired. For some adhesive applications, the stack may include not more than 30, not more than 20 or not more than 10 plates per centimeter of length of the stack. The stack design permits for very efficient use of plates to provide a large density of extrusion orifices per plate. The stack may include a number of plates that is at least as large as large as the number of extrusion orifices in a row of extrusion orifices in the stack. The stack may, however, include a ratio of extrusion orifices (including in all rows of extrusion orifices) to a number of plates in the stack of at least 1:1, at least 1.5:1 or at least 2:1. Even in the case of multiple rows of extrusion orifices, a ratio of number of extrusion orifices in the stack to the number of plates in the stack may often be not greater than 3:1, not greater than 6:1 or not greater than 10:1.

Through control of variables such as thickness of plate, the geometries of the plates and the number of plates used, the stack may be constructed of any desired length and with a variety of extrusion orifice and gas opening geometries, provided that the polymer distribution channels and gas distribution channels in the stack should be sufficiently sized to provide adequate polymer flow to all extrusion orifices within the stack and adequate gas flow to all gas openings within the stack. For many applications, the stack may have a length of at least 0.015 meter, at least 0.05 meter, at least 0.1 meter, at least 0.25 meter or at least 0.5 meter. For many applications, the stack may have a length of not greater than 1.5 meter, not greater than 1 meter, not greater than 0.75 meter, not greater than 0.5 meter or not greater than 0.25 meter. A longer stack length may often be desired for nonwoven applications. For some nonwoven applications, the stack may have a length of at least 0.25 meter, 0.5 meter or 0.75 meter. For some adhesive applications, the stack may have a length of not greater than 0.25 meter or not greater than 0.1 meter.

Polymer that may be processed through a melt blowing die may be any thermoplastic polymer. Examples of some polymers for nonwoven applications include polyolefins (e.g., polyethylene, polypropylene), polyethylene terephthalate, polylactic acid and polybutylene terephthalate. Examples of some polymers for adhesive applications include styrene block copolymers, pressure-sensitive adhesives, styrene-butadiene copolymers, ethylene vinyl acetate and amorphous polypropylene.

The gas distribution system within the stack may include at least one row of gas openings associated with each row of extrusion orifices. In some implementations, two rows of gas opening may be associated with each row of extrusion orifices, such as with one row of gas outlet openings be disposed on one side of the associated row of extrusion orifices and the other row of gas outlet openings disposed on an opposite side of the associated row of extrusion orifices. Each row of gas openings may include one or more than one gas opening per extrusion orifice of the corresponding row of extrusion orifices. The gas distribution system may include one or more gas distribution channels extending longitudinally through multiple plates of the stack in the stack direction and each gas distribution channel may be in fluid communication within the stack with at least one row of gas openings, and may be in fluid communication with two or more rows of gas openings, to supply gas to such gas openings. Such gas distribution channels may be designed similarly with the discussion above concerning the polymer distribution channels. Such gas distribution channels may be open to receive feed only at a longitudinal end of the gas distribution channel, similar to feed of polymer to the polymer distribution channels. Similarly with the discussion concerning the polymer distribution channel, the gas distribution channel may have a cross-section that tapers in the stack direction moving away from the feed end of the gas distribution channel. Such cross-section, transverse to the stack direction, may reduce in size with each successive plate moving in the stack direction away from the feed end of the gas distribution channel. The gas distribution system may include gas passages between the gas distribution channel and each gas opening fed by the gas distribution channel, in a manner similar to as described with respect to polymer feed through polymer passages to extrusion orifices. The gas fed to the gas distribution system may be air, nitrogen gas or any other gas composition.

The plates of a stack may each include a portion of each polymer distribution channel in the stack. Other die components adjacent to ends of the stack that do not include a portion of each polymer distribution channel are not part of the stack. Such other component or components may be or be part of an end unit that may seal off one end of a polymer distribution channel or may provide polymer feed to the stack and each polymer distribution channel in the stack. Such other components also include stack structures that may be continuous with the plate structure of the stack. In some implementations, one terminal end of the stack may have a terminal plate that both includes a portion of the geometry of the polymer distribution channel and has a terminal wall that seals off that terminal end of the polymer distribution channel. Such a terminal plate may also include geometry for an extrusion orifice of one or more rows of extrusion orifices fed by the polymer distribution channels. In some alternative implementations, the polymer distribution channel may be open at the terminal end of the stack, but as incorporated into a melt blowing die would be sealed off by an adjoining structure of the die, such as an end unit.

The plates of a stack may each include a portion of each gas distribution channel in the stack, in a manner similar to that as described for polymer distribution channels, and one terminal end of such a gas distribution channel may be sealed off by a terminal plate of the stack or by a mating structure when the stack is incorporated into a melt blowing die.

All plates of a stack may have the same configuration or some or all plates may have different configurations from each other. Differences in configurations may include for example with respect to plate width, cross-section of a polymer distribution channel and/or gas distribution channel from plate to plate or geometry in relation to die tip feature (e.g., extrusion orifices, polymer passages, gas openings and gas passages). Also, some plate configurations may include geometries for extrusion orifices of only some rows of extrusion orifices while other plate configurations include geometries for extrusion orifices of other rows of extrusion orifices. In some implementations, all plates of a stack may have the same or similar die tip geometries. For example, each plate may include geometries for an extrusion orifice for each row of extrusion orifices of the stack, for a polymer passage for each such extrusion orifice, for gas openings associated with each such extrusion orifice and for gas passages to each such gas opening. Such features may be formed into one side of the plate, while the other side of the plate may provide a barrier between such die tip geometries on different plates. In some alternative implementations, the plates may not all include die tip geometries and/or may not all include the same die tip geometries. For example in some implementations the stack may include two or more different repeating geometries that repeat in a sequence through the stack. A simple example would be two different plate geometries that alternate in the stack. A first plate configuration may include a first set of die tip geometries and a second configuration may include a different set of die tip geometries or no die tip geometries (i.e., a blank plate with respect to die tip features). Table 1 lists a few examples designs of first and second plate geometries that may alternate in a two-plate alternating structure and some exemplary applications for such designs. It will be appreciated that "first" and "second" distinguish between different configurations and do not designate which plate configuration may appear first or last in the stack.

TABLE 1

| Example Design | Plate Configuration | Polymer Extrusion Geometry | Gas Outlet Geometry | Polymer Valve Geometry | Gas Valve Geometry | Application |
|---|---|---|---|---|---|---|
| A | 1 | No | Yes | No | No | Nonwoven |
|   | 2 | Yes | Yes | No | No |  |
| B | 1 | No | Yes | No | No | Adhesive |
|   | 2 | Yes | Yes | Yes | No |  |
| C | 1 | No | No | No | No | Adhesive |
|   | 2 | Yes | Yes | Yes | Yes | Adhesive |

As seen in Table 1, example designs A and B includes plates providing gas outlets both on plates with extrusion orifice geometries and on flanking plates on either side of the extrusion orifice. Assuming a row of gas outlets is provided on each side of a row of extrusion orifices, then each extrusion orifice in designs A and B would be associated with six gas openings, while for example design C each extrusion orifice would be associated with only two gas openings.

A melt blowing die may include an end unit disposed adjacent to a proximal longitudinal end of the stack into which polymer is fed to the polymer distribution channel. Such an end unit may include a polymer inlet, and may include a manifold feature to distribute polymer among multiple polymer distribution channels within the stack. The end unit may include a polymer feed port that is in fluid communication with each of polymer distribution channels in the stack to supply polymer feed to each such polymer distribution channel. The end unit may include a gas inlet port in fluid communication with each gas distribution channel in the stack to provide gas to such gas distribution channels.

A melt blowing die may include an end unit adjacent a distal longitudinal end of the stack, away from an end of the stack in which polymer is fed into the polymer distribution channel. The end unit adjacent to the distal longitudinal end of the stack may provide features that close off and may seal at the distal end each polymer distribution channel and gas distribution channel that may otherwise be open at the distal end of the stack.

An end unit, such as those described in the preceding paragraph, may be mated to a stack of plates at a longitudinal end of a melt blowing die. In some implementations, a melt blowing die may include multiple stacks of plates wherein at least one end unit is an intermediate end unit disposed between two stacks of plates. The stacks of plates may be oriented with their respective polymer distribution channels opening into such an intermediate end unit so that polymer feed may be directed to the polymer distribution channels of both of the stacks through the intermediate end unit. Polymer may then flow in opposing directions outward from the intermediate end unit through the polymer distribution channels of the two stacks. A melt blowing die may include more than two stacks. When two or more stacks are included in a melt blowing die, the stacks maybe aligned longitudinally to extend in the longitudinal direction of the melt blowing die. Regardless of how many stacks of plates are included within the melt blowing die, the melt blowing die may include a single polymer inlet to receive polymer feed for all stacks within the melt blowing die. The melt blowing die may include an internal manifold system that supplies polymer to all of the different stacks within the melt blowing die. The internal manifold system may provide that polymer feed to the polymer distribution channels of all stacks travels an equal length flow path from polymer inlet to a feed end of each of the stacks. The melt blowing die may include multiple units including opposed pairs of stacks with a common central feed through an intermediate end unit. Similarly, a melt blowing die may include only a single gas feed inlet regardless of the number of stacks included in the melt blowing die and the melt blowing die may include internal gas manifolding to provide gas feed to each of the stacks, in a manner similar to that described for polymer feed. In some alternative implementations, a melt blowing die may include multiple (2 or more) polymer inlets and/or gas inlets.

As noted above, a polymer distribution channel in the stack in a melt blowing die is open to receive polymer feed only through at a longitudinal end of the polymer distribution channel. This does not mean that polymer feed must be open at only one longitudinal end of the polymer distribution channel, but rather means that there is no opening into the polymer distribution channel other than at a longitudinal end of the polymer distribution channel. In other words, both longitudinal ends of the polymer distribution channel may be open to receive polymer feed or alternatively only one of the longitudinal ends may be open to receive polymer feed. In preferred implementations, the polymer distribution channel is open to receive polymer feed at only one such longitudinal end, and the other longitudinal end is closed off either by a feature of a terminal plate of the stack or by another structure of the melt blowing die, such as an end unit. The disclosure herein is directed primarily to such preferred implementations. However, in some alternative implementations, one or more polymer distribution channels in the stack may be open to receive polymer feed at both longitudinal ends of the polymer distribution channel. Feeding polymer into both longitudinal ends of a polymer distribution channel does not provide the same high level of control of polymer flow in a melt blowing die as configurations providing polymer feed to only one longitudinal end, but providing feed to both longitudinal ends may still provide sufficient control of polymer flow for some applications, and may permit use of longer stacks for some applications. When polymer feed is into both longitudinal ends of a polymer distribution channel, in some implementations the polymer distribution channel may have a cross-section that tapers inwardly from each end and that reaches a minimum in the center of the stack, so that the stack may have a coat hanger-type geometry through each half of the stack with a reduced opening between the longitudinal halves of the stack. In this way, the two longitudinal halves of the stack behave largely as separate stacks. In the more preferred situation when polymer distribution channels are open to receive polymer feed only at one longitudinal end, it is generally also preferred that all polymer distribution channels are fed from the same longitudinal end of the stack, but in some implementations at least one polymer distribution channel may be open for polymer feed at one end of the stack and at least one other polymer distribution channel may be open for polymer feed at the other longitudinal end of the stack, and end units at both ends of the stack may be configured to provide polymer feed to the stack. Different implementations as discussed herein for polymer distribution channels may be applied as well to gas distribution channels in the stack.

In a melt blowing apparatus, the collection substrate may include any moving structure on which melt blown filaments may collect or that may support a work piece on which the melt blown filaments are to be deposited, such as for an adhesive application. The collection substrate may be rotatable to move a nonwoven or work piece in the machine direction, such as a rotating drum. The collection substrate may be a translatable structure, such as a translatable belt or web on which fibers collect or that may support work pieces on which fibers are deposited.

In a method of the disclosure, the melt blowing die utilized in the method may be according to the first aspect or may have any feature or features described herein, or may be a melt blowing die of different design. The method may be performed using an apparatus of the second aspect of the disclosure, or an apparatus of a different design. The fiber-containing material may be a nonwoven structure or may be an adhesive. For nonwoven applications, the method may be performed in a continuous process with collection of a continuously produced nonwoven structure. For some adhesive applications in particular, it may be desirable for the melt blowing die have a capability to operate intermittently with valving to turn polymer flow on and off to extrusion orifices, and optionally also to turn gas flow on and off to gas openings, to accommodate selective deposition of adhesive to work pieces having surfaces to be adhered to other surfaces of the work piece or other surfaces of other pieces. Such valving may permit fast cycling time between on and off positions to accommodate high volume manufacturing operations including application of adhesive to work pieces. The method may include producing attenuated polymer filaments having an average diameter as desired for the particular application. For many applications, the attenuated polymer filaments will have an average diameter in a range having a lower limit of 1 nanometer, 10 nanometers, 100 nanometers or 500 nanometers and an upper limit of 500 microns, 100 microns, 10 microns, 2 microns, 1 micron, 800 nanometers, 600 nanometers or 400 nanometers, provided the upper limit is larger than the lower limit. For many nonwoven applications, the attenuated fibers may have an average diameter of not larger than 1 micron, not larger than 800 nanometers, not larger than 600 nanometers or not larger than 400 nanometers. For many adhesive applications, attenuated filaments may often have average diameter of at least 1 micron. The method may involve extruding polymer from the melt blowing die at a throughput rate in a range having a lower limit of 0.01, 0.05, 0.1, 0.5 or 1 and an upper limit of 10, 5, 2, 1, 0.5 or 0.25 grams of polymer per minute per extrusion orifice. For many nonwoven applications, relatively low throughput rates per extrusion orifice may be desired to produce high quality nonwovens. For many adhesive applications, higher throughput rates per extrusion orifice may often be desired. Polymer extrusion may be performed over a wide range of polymer throughputs per centimeter of length of the stack for each stack in the melt blowing die. For some implementations, the throughput rate for each row of extrusion orifices in a stack may be in a range having a lower limit of 0.4, 1, 2, 5, 10 or 20 grams per centimeter of length of the stack and an upper limit of 200, 100, 50, 25, 10, 5, 2 or 1 grams per minute per centimeter of length of the stack, provided that the upper limit is larger than the lower limit.

Additional aspects, and additional features and feature refinements, will be understood with reference to the drawings and to the additional description provided below.

DETAILED DESCRIPTION

Figure 1:
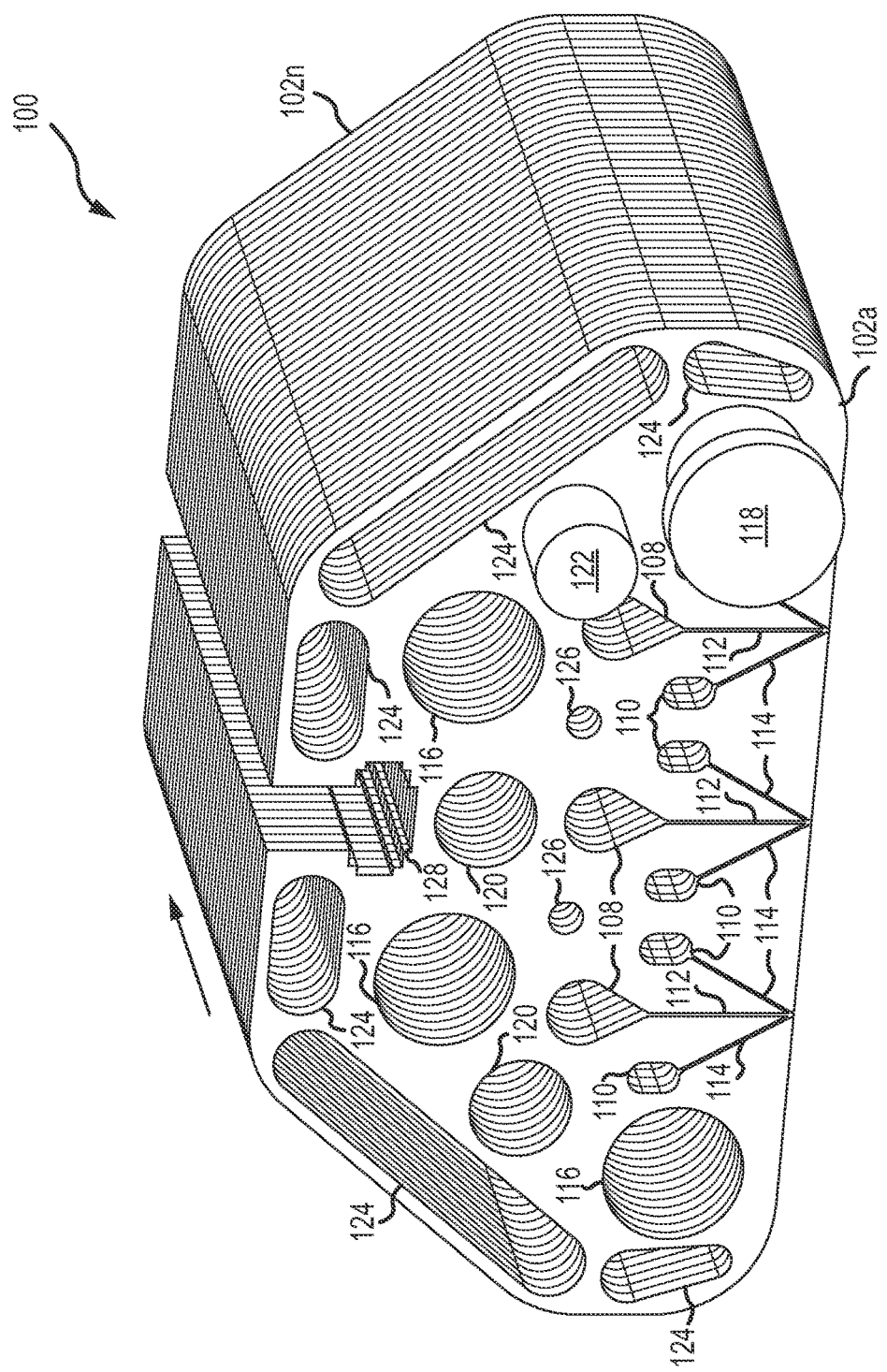
FIG. 1 shows an example stack of plates for use in a melt blowing die.
Figure 2:
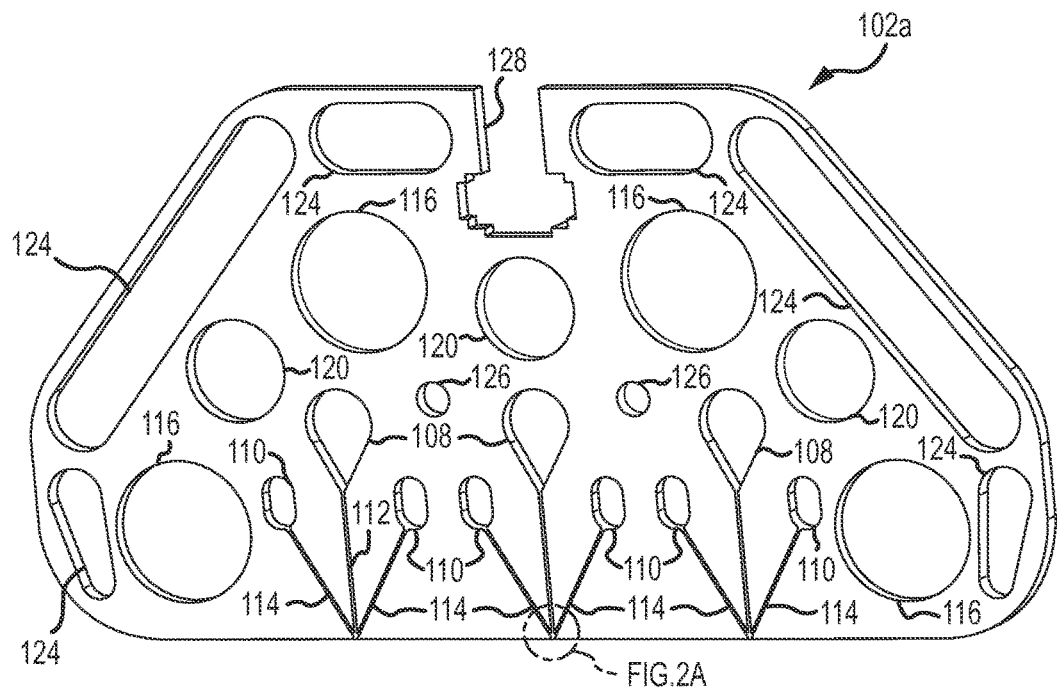
FIG. 2 shows one plate from the stack of plates of FIG. 1.
Figure 2A:
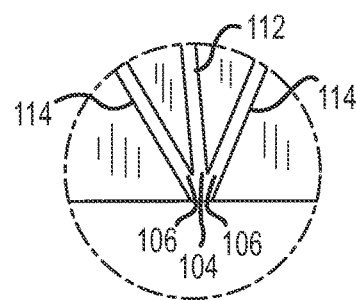
FIG. 2A shows detail of a portion of geometries for die tip functionality in the plate of FIG. 2.

Referring to FIGS. 1-2A, an example embodiment is shown of a stack 100 of plates 102 that may be used in a melt blowing die. Although only a small number of the plates 102 are shown in FIG. 1, such a stack 100 may include any number of the plates 102, for example hundreds or even thousands of the plates 102. The stack 100 is shown in FIG. 1 with a first plate 102a located at a first longitudinal end of the stack 100 and a final plate 102n disposed at a second longitudinal end of the stack 100. The first end of the stack may be referred to as a proximal end, being the end into which polymer melt would be fed during a melt blowing operation. The second end of the stack may be referred to as a distal end, being at the end that is distant from the end into which polymer is fed. The plates 102 of the stack 100 are stacked in a stack direction, indicated by the arrow shown in FIG. 1 pointing in a direction from the proximal end to the distal end. The stack direction may also be referred to as the longitudinal direction of the stack 100. FIG. 2 shows an individual plate, which is for convenience the first plate 102a. FIG. 2A shows detail on the arrangement of polymer extrusion orifices 104 and gas openings 106

The stack 100 includes three rows of extrusion orifices 104 with two rows of gas openings 106 associated with each row of extrusion orifices 104, with a row of gas openings 106 disposed on either side of each row of extrusion orifices 104. The gas openings 106 are oriented so that gas exiting the gas openings 106 will impinge upon and attenuate polymer filaments being extruded out of the extrusion orifices 104 during a melt blowing operation.

Each row of extrusion orifices 104 is in fluid communication with a polymer distribution channel 108 to receive polymer feed. Likewise, each row of gas openings 106 is in fluid communication with a gas distribution channel 110 from which gas is delivered to the gas openings 106. Each row of extrusion orifices 104 is in fluid communication with a polymer distribution channel 108 such that all of the extrusion orifices 104 of the row are supplied with polymer from a single polymer distribution channel 108. Similarly, each row of gas openings is in fluid communication with a gas distribution channel 110 such that all gas openings 106 of the row are supplied with gas from a single gas distribution channel 110. Each extrusion orifice 104 is in fluid communication with the corresponding polymer distribution channel through a separate, dedicated polymer passage 112 between the polymer distribution channel 108 and the extrusion orifice 104. The plate design shown in FIGS. 1-2A permits the use of polymer passages that have a length to diameter (L/D ratio) that is very large, promoting uniform, laminar flow of polymer to produce high quality extruded polymer filaments from the extrusion orifices 104 during melt blowing operations. In a similar manner, the gas openings 106 are in fluid communication with the corresponding gas distribution channel 110 through gas passages 114.

During a melt blowing operation, polymer would be fed into each of the polymer distribution channels 108 through proximal longitudinal ends of the polymer distribution channels 108 opening at the proximal end of the stack 100. Polymer fed into each polymer distribution channel 108 would then flow through the stack 100 across the plates 102 to supply polymer to the extrusion orifices 104 through the polymer passages 112. As the stack 100 may be incorporated into a melt blowing die, each polymer distribution channel 108 would be closed at a distal end of the polymer distribution channel 108 disposed toward the distal end of the stack 100. The distal longitudinal ends of the polymer distribution channels 108 may, for example, be closed off by features of the last plate 102n, or, more typically, may be closed off by an end cap mated with the last plate 102n of the stack 100. Likewise, polymer feed to the proximal ends of the polymer distribution channels 108 may be fed and distributed to the polymer distribution channels 108 through an end unit that may be mated with the first plate 102a of the stack 100.

The plates 102 in the stack may all have the same configuration or different ones of the plates may have different configurations. The plates 102 of the stack may be such that a geometry of the polymer passages 112 and extrusion orifices 104 are formed into one side of a plate 200 but not entirely through the width of the plate 102, so that such a plate 102 provides three sides of the geometry of the channels 112 and extrusion orifices 104, and a mating side of a mating adjacent plate 102 may provide the fourth side for the polymer passages 112 and extrusion orifices 104. Similar geometries may be provided in plates 102 for the gas passages 114 and gas openings 106. In some alternative designs, a portion of the geometry of each polymer passage 112 and each corresponding extrusion orifice 104 may be cut into mating sides of adjoining plates 102 so that the mated plates 102 provide the full geometry for each of the polymer passages 112 and extrusion orifices 104. Similar alternative designs may or may not also be provided for the gas passages 114. In some other alternative designs, the polymer passages 112 and extrusion orifices 104 may be provided by a full passage geometry formed entirely through the width of a plate 102, with mating plates on either side providing flush mating surfaces to close off the polymer passages 112 and extrusion orifices 104 on either side of the plate 102 through which the polymer passage 112 and extrusion orifice 104 geometries are formed. Similar alternative designs may or may not also be used for the gas passages 114. In some implementations the gas passages 114 may be separate and distinct, in some other implementations adjacent gas passages 114 may be open to each other in the direction of the stack 100, so that the combined gas openings 106 together may form a single slit along the entire length of the corresponding row of polymer orifices 104.

Features in plates may be formed by any technique. For example, features may be formed in blank plates by removing material from the plates to form the features. This may be accomplished for example by laser ablation or chemical etching techniques to form patterns of geometries in plates. The plates may be made of any material, for example steel or other metallic materials or ceramic materials.

Each row of gas openings 106 associated with a row of extrusion orifices 104 may include one gas opening per corresponding extrusion orifice. Alternatively each such row of gas openings 106 may include two or more gas openings 106 per extrusion orifice 104. For example, each plate 102 containing polymer passage 112 and extrusion orifice 104 geometry may be flanked on either side with a plate 102 not including polymer passage 112 and extrusion orifice geometries but including gas passage 114 and gas opening 106 geometries, to provide multiple gas openings 106 in each row of gas openings 106 per each extrusion orifice 104 in the associated row of extrusion orifices 104.

As shown in FIGS. 1 and 2, the stack 100 includes four connector passages 116 (e.g., bolt holes) extending through the stack 100 in which may be received a connector member, such as for example a bolt, which may hold the stack 100 together with the plates 102 securely pressed together to maintain a seal between the plates 102 to prevent leakage of gas and polymer during melt blowing operations. FIG. 1 shows an example connector member 118 in the form of a bolt extending through one of the connector passages 116. As will be appreciated, the connector member 118 may also pass through and secure with the stack an end unit that may be mated with the first plate 102a and/or an end unit that may be mated with the last plate 102n.

The stack 100 also includes three heating element cavities 120 extending through the stack 100. The heating element cavities 120 may be configured to receive heating elements to heat the stack 100 to maintain a desired uniform temperature during a melt blowing operation. FIG. 1 shows an example heating element 122 in the form of a resistive heating rod disposed through one of the heating element cavities 120. As will be appreciated, the heating element 122 may also extend through an end unit that may be mated with the first plate 102a and/or an end unit that may be mated with the last plate 102n.

The stack 100 also includes a number of thermal barrier cavities 124 extending through the stack 100. The thermal barrier cavities 124 are located near the peripheral edges of the stack 100 and are disposed between such peripheral edges and the polymer distribution channels 108 to help reduce thermal losses from a core of the stack 100 to the peripheral edges of the stack 100. The thermal cavities 124 thus provide a heat transfer barrier that may help to maintain a uniform temperature within a core portion of the stack 100 where polymer and gas flow take place during a melt blowing operation. The thermal barrier cavities 124 may be left as vacant space or may be filled with an insulating material to provide an even larger heat transfer barrier.

The stack 100 also includes two centrally-located sensor taps 126 extending through the stack 100, and in which temperature or other sensor probes may be disposed to monitor one or more conditions (e.g., temperature) within the stack 100.

Each plate 102 of the stack includes a portion of the geometry of each of the polymer distribution channels 108, gas distribution channels 110, connector passages 116, heating element cavities 120, thermal barrier cavities 124 and sensor taps 126. Thus, removal of any of the plates 102 from the stack 100 will change the geometry of all of those features in the stack 100.

Each of the plates 102 of the stack 100 also includes a slot 128 that may be keyed to correspond with a mandrel of corresponding keyed shape to be received within the row of the slots 128 to align the plates 102 for easy assembly or disassembly of the stack 100. Similar slots 128 may also be included on end units that may be mated with the first plate 102a and/or the last plate 102n for easy assembly with or removal of the end units from adjacent the ends of the stack 100 and for mounting the finished assembly onto a bracket. Said keyed slot also provides temperature isolation pockets, so that thermal energy is not passed to the mounting member.

Figure 3:
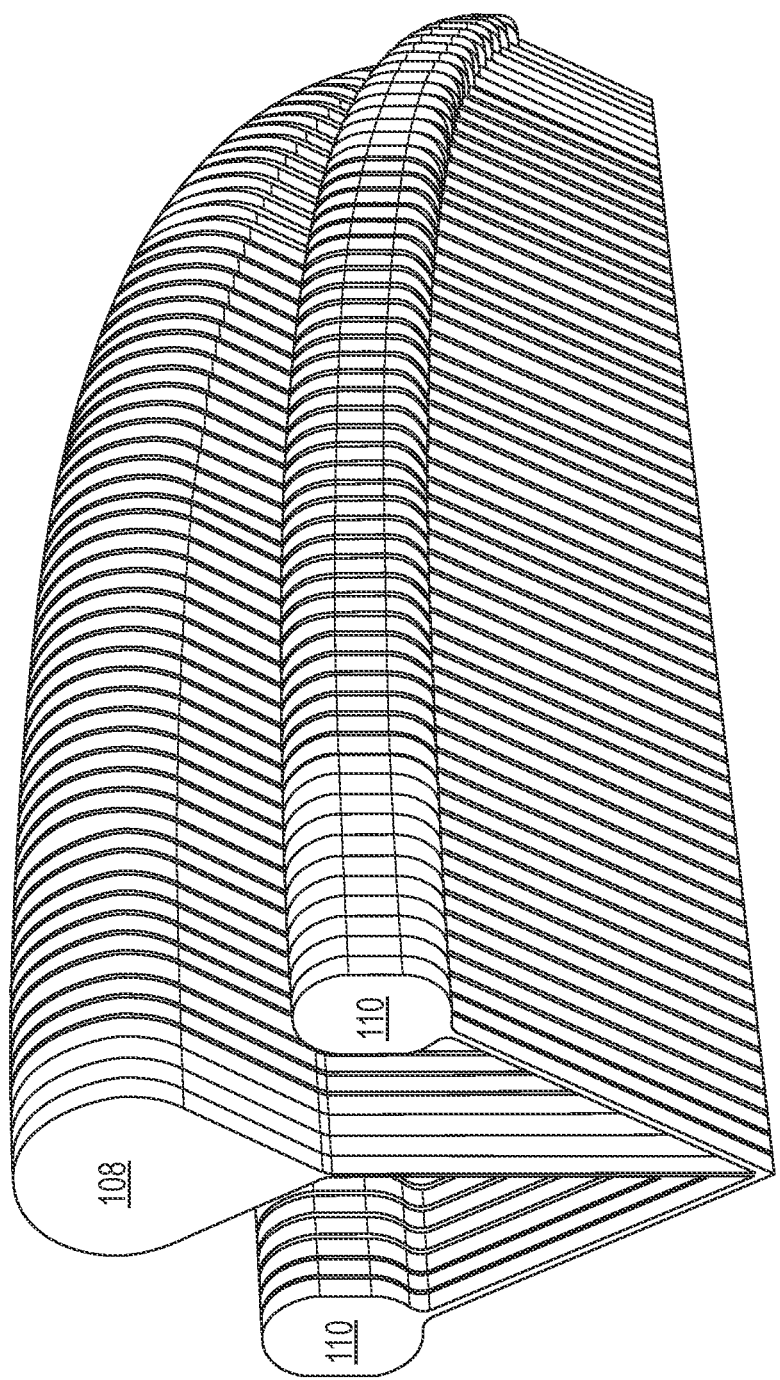
FIGS. 3 and 4 show some example tapering geometries for polymer distribution channels and air distribution channels that may be included in a stack of plates, viewed from different perspectives.

In an enhancement of the stack 100, the polymer distribution channels 108 and/or the gas distribution channels 110 may have geometry within the stack that promotes more uniform flow properties for polymer and/or air to the different extrusion orifices 104 and/or gas openings 106 located along a row extending in the direction of the stack. Such geometry may include nonlinear taper in the cross-section of the respective channel, and the channel may become closer to the extrusion orifices 104 or gas openings 106, as the case may be, moving through the stack 100 in the stack direction away from the proximal longitudinal end of the stack. FIG. 3 shows one example for such a tapering profile for an example polymer distribution channel 108 and corresponding gas distribution channels 110 associated with a row of polymer orifices 104. As shown in FIG. 3, the polymer distribution channel 108 and gas distribution channels 110 may each have a cross-section transverse to the stack direction that tapers in the stack direction moving away from the proximal longitudinal end of the stack 100 toward the distal longitudinal end of the stack 100. The polymer distribution channel 108 may have a geometry that provides for equal residence time of polymer flow through the polymer distribution channel 108 and the polymer passages 112 to each of the extrusion orifices 104 in a row of the extrusion orifices 104 fed by the polymer distribution channel 108. Similarly, each gas distribution channel 110 may have a geometry that provides equal residence time for gas flow through the gas distribution channel 110 and through the gas passages 114 to the gas openings 106 of a row of gas openings 106 fed by the gas distribution channel 110. Such geometries are examples of what are sometimes referred to as "coat hanger" geometries.

Figure 4:
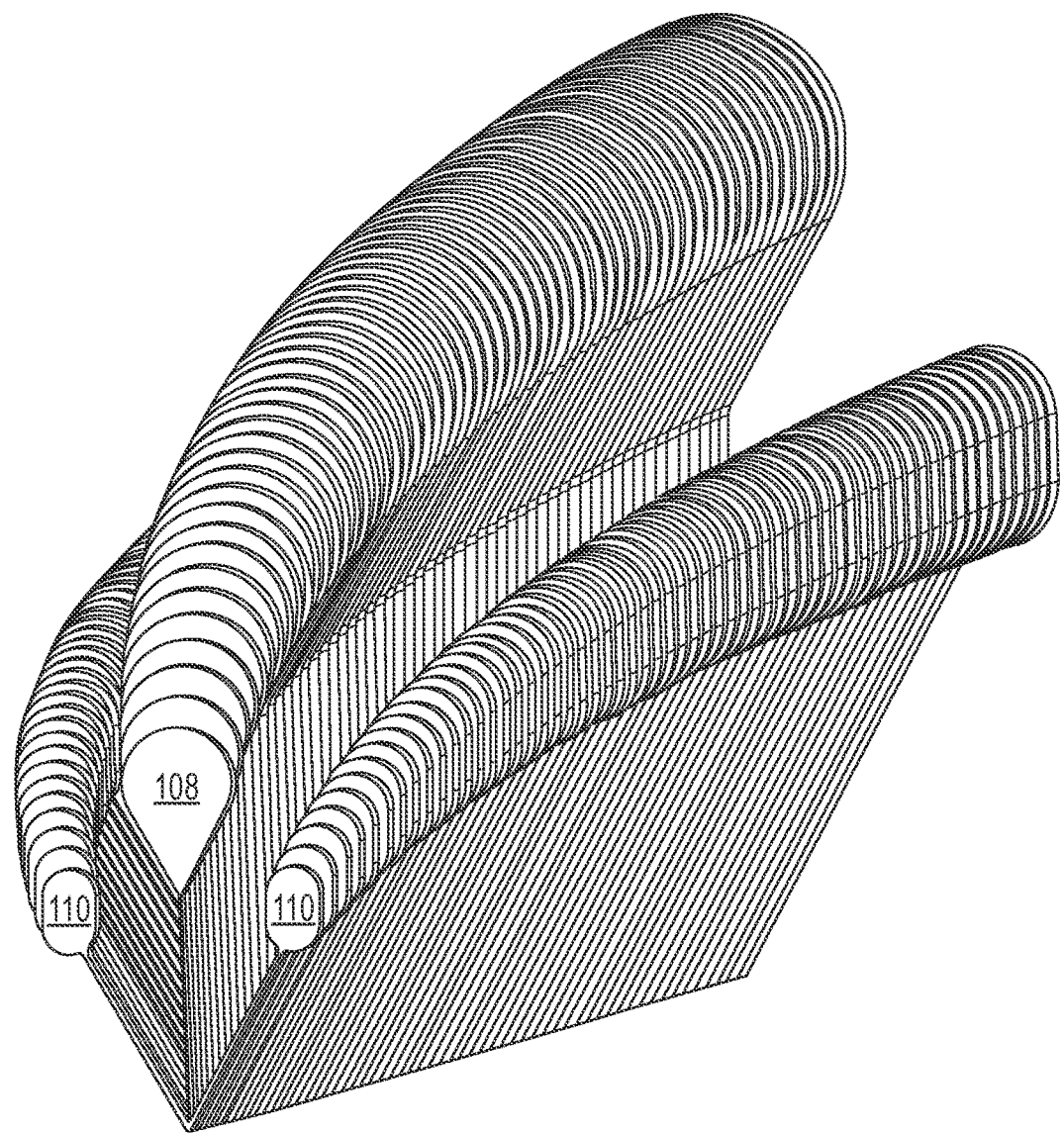

FIG. 4 shows the same geometries for the polymer distribution channel 108 and gas distribution channels 110 as shown in FIG. 3, but viewed from a distal longitudinal end of the stack 100, as opposed to being viewed from a proximal longitudinal end of the stack 100 as shown in FIG. 3.

The use of a coat hanger geometry for the polymer distribution channels 108, and also for the gas distribution channels 110, may be advantageous especially for nonwoven applications, where uniformity of attenuated polymer filament properties at all locations along a die may be important to obtain a nonwoven structure with consistent and uniform properties. One such example is when the nonwoven may be used as a filter where uniformity in filter properties is important. Coat hanger geometries may also be beneficial for polymer uniformity in adhesive applications, but such a high degree of polymer uniformity is often not as important for adhesive applications as for some nonwoven applications. However, for adhesive applications an ability to intermittently operate a melt blowing die on short cycle times may be important, unlike many nonwoven applications where a continuous melt blowing operation may often be the case.

Figure 5:
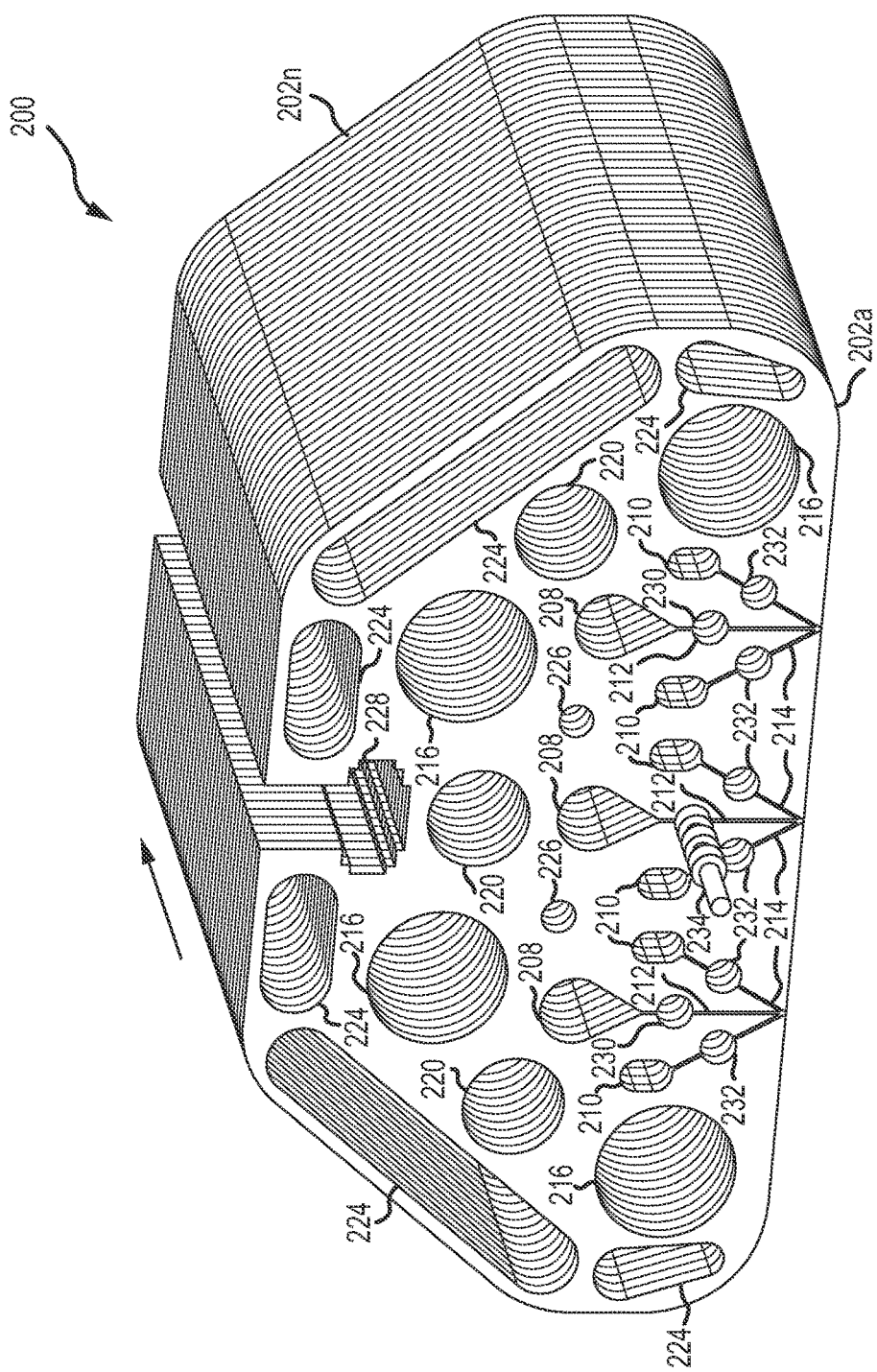
FIG. 5 shows another example stack of plates for use in a melt blowing die.
Figure 6:
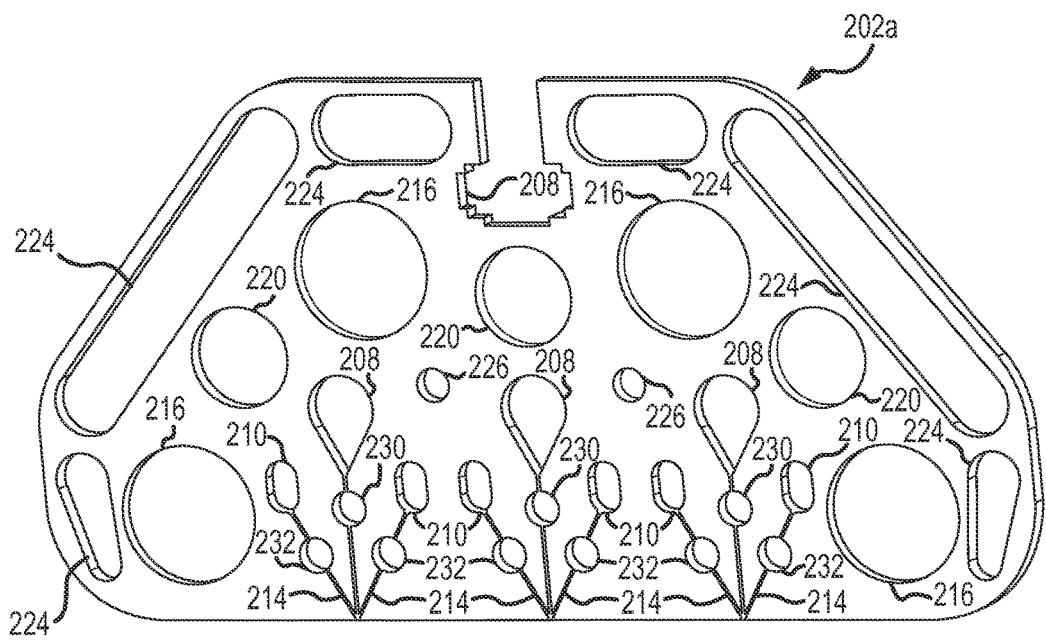
FIG. 6 shows one plate of the stack of plates of FIG. 5.

Reference is now made to FIGS. 5 and 6 showing an embodiment of a stack of plates that may advantageously provide for intermittent operation, such as may be desirable for some adhesive applications. FIG. 5 shows a stack 200 of plates 202 including three rows of polymer distribution orifices with each row of polymer extrusion orifices associated with two rows of gas openings. The configuration of polymer extrusion orifices and gas openings may be similar to such features as described in relation to FIGS. 1-2A. The stack 200 of FIG. 5 includes polymer distribution channels 208, gas distribution channels 210, connector passages 216, heating element cavities 220, thermal barrier cavities 224, sensor taps 226 and a keyed slot 228, similar to the corresponding features shown and described for the stack 100 of FIGS. 1 and 2. A distinguishing characteristic of the stack 200 relates to features of the polymer passages 212 and the gas passages 214 that accommodate valving to permit rapid cycling of polymer and gas flow between on and off states. The polymer passages 212 are similar to the polymer passages 112 shown in FIG. 1-2A, except that the polymer passages 212 of FIG. 5 each includes a valve cavity 230 in which a valve mechanism may be disposed to permit polymer flow through the polymer passages 212 to be turned on and off for use in intermittent melt blowing applications. A single valve unit may be disposed through a row of the valve cavities 230 corresponding with a row of extrusion orifices 204 to provide valving capability for all polymer passages 212 of the row to permit flow of polymer to the extrusion orifices 204 of that row to be turned on and off simultaneously with a single manipulation of the valve unit. The valve unit corresponding with a row of extrusion orifices may have an actuation member, which may extend beyond the stack 200 in a proximal or distal direction to be manipulable to simultaneously reposition all valves corresponding with a row of extrusion orifices between open and closed positions to intermittently permit or stop polymer flow as desired. The gas passages 214 may likewise include valve cavities 232 through which similar valve units may disposed to provide similar valve control to simultaneously turn gas flow on and off to all gas openings of a row of gas openings. This design permits all valves corresponding with a row of polymer extrusion orifices or a row of gas openings to be simultaneously opened and closed through actuation of a single actuation member by a single solenoid, significantly simplifying valving for intermittent melt blowing operations, such as may be desirable for many adhesive deposition applications. FIG. 5 shows an example valve unit 234 being inserted into one row of valve cavities 230 and including an actuator member located at a proximal end of the valve unit.

Figure 10:
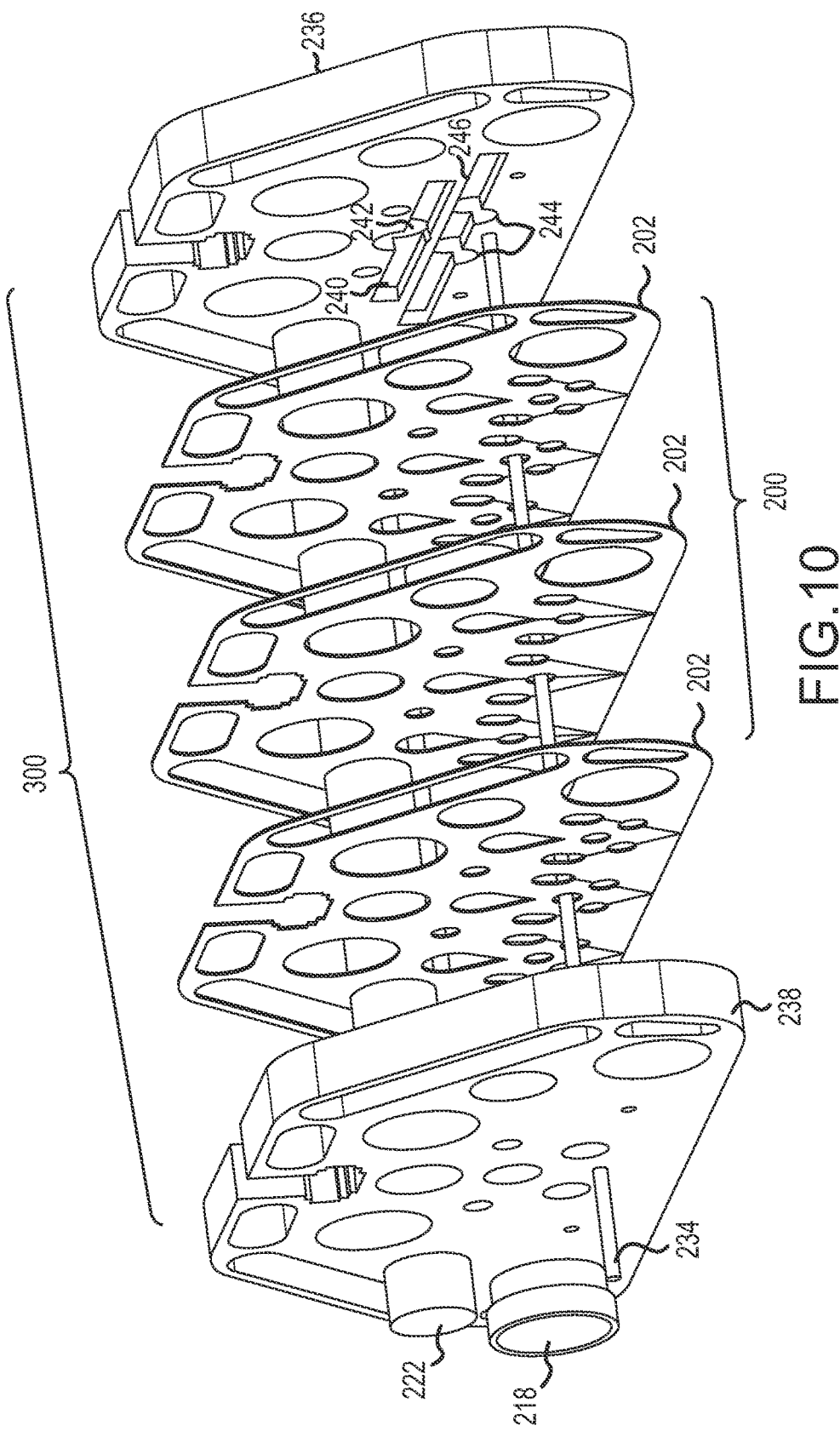
FIG. 10 illustrates the stack of FIG. 5 incorporated into one example of a melt blowing die.

Reference is now made to FIG. 10, together with FIGS. 5 and 6. FIG. 10 illustrates in expanded view of one example embodiment of a melt blowing die assembly 300 including the stack 200 of plates 202 of FIG. 5. Only three example plates 202 of the stack 200 are shown for simplicity of illustration, rather than all of the plates 202 of the stack 200. The stack 200 is disposed between two end units 236 and 238. The plates 202 as shown in FIG. 10 are turned around relative to the view shown in FIG. 5, so that in the melt blowing die assembly 300 shown in FIG. 10, the proximal end of the stack 200 is disposed toward the right side of the drawing, toward end unit 236, and the distal end of the stack 200 is disposed towards the left side of the drawing, toward the end unit 238. As seen in FIG. 10, the end unit 236 includes a polymer distribution manifold 240 fed by a single polymer inlet 242. Polymer fed into the polymer inlet 242 flows into and distributes along the polymer manifold 240 to provide polymer feed to a proximal longitudinal end of the polymer distribution channels 208. Likewise, two gas inlets 244 in the end unit 236 provide inlet gas through the to a gas manifold 246 in the end unit 236 to provide gas feed to a proximal longitudinal end of each of the gas distribution channels 210. The end unit 238 closes off and seals distal ends of the gas distribution channels 210 and polymer distribution channels 208. Therefore, polymer feed to each polymer distribution channel 208 is only through one longitudinal end of the polymer distribution channel via the polymer inlet 242 and polymer manifold 246 in the end unit 236, and all gas feed to each gas distribution channel 210 is likewise only into one longitudinal end of each gas distribution channel 210 via the gas inlets 244 and the gas manifold 246 in the end unit 236. For illustration purposes, an example heating element 222, an example connector member 218 and an example valve unit 234 are shown extending through the melt blowing die assembly 300 in the stack direction, which is also the longitudinal direction of the die assembly 300.

As an alternative to the design shown in FIGS. 5 and 6, in some alternative implementations the polymer passages 212 may be provided with valving capability while the gas passages may not be provided with valving. In such implementations, the gas passages 214 may be configured similar to the gas passages 114 of FIGS. 1-2A, not including the valve cavities 232. In such alternative implementations, polymer flow may be intermittently turned on and off while gas flow may remain on even while the polymer flow is turned off. Such an alternative operation reduces complexity associated with synchronizing timing of actuation of gas and polymer valves.

Figure 9:
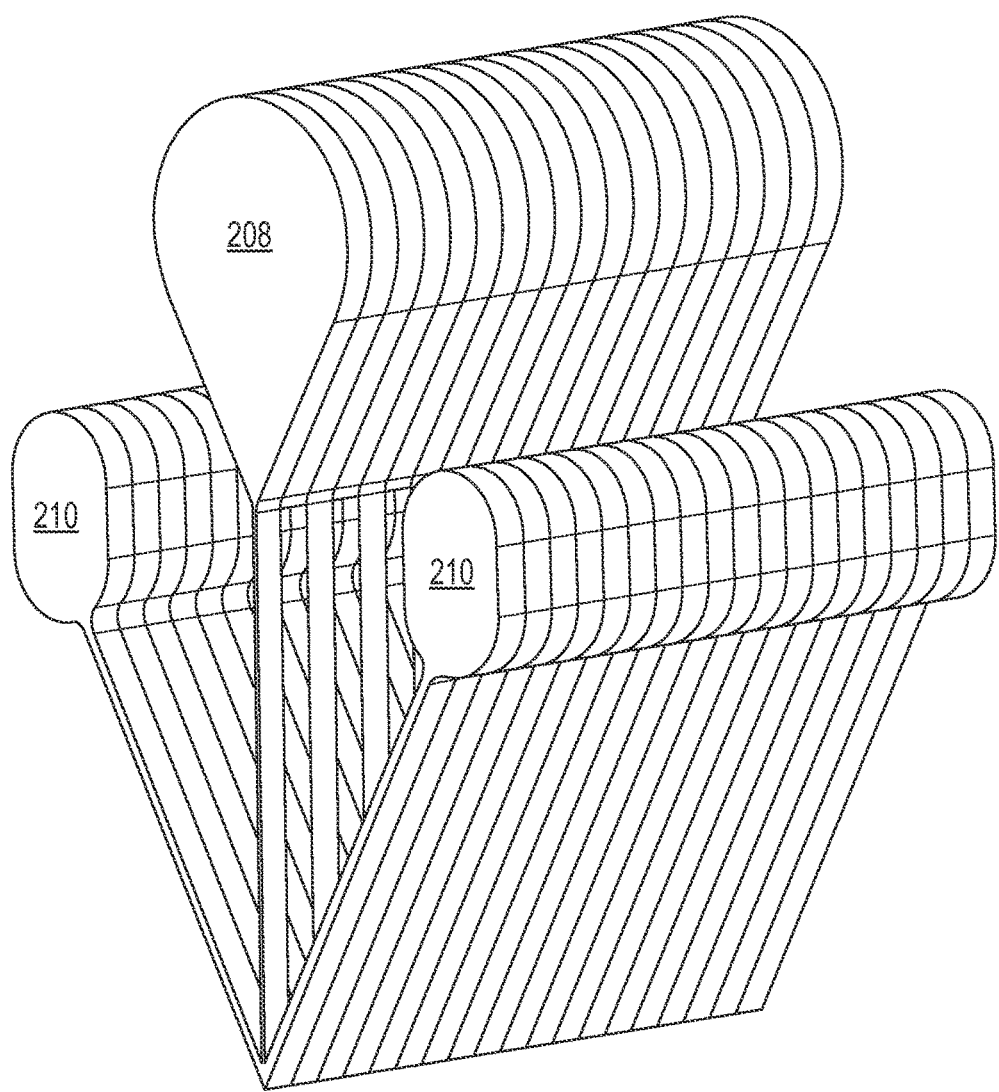
FIG. 9 shows some example non-tapering geometries for polymer distribution channels and air distribution channels that may be included in a stack of plates.

The polymer distribution channels 208 and/or gas distribution channels 210 may have tapering, coat hanger geometries similar to those shown in FIGS. 3 and 4. However, in some alternative designs the cross-section available for flow through the polymer distribution channels 208 and/or gas distribution channels may not taper. FIG. 9 shows some example non-tapering geometries for the polymer distribution channels 208 and gas distribution channels 210 of the stack 200 of FIG. 5. As shown in FIG. 9, the geometries for the polymer distribution channels 208 and the gas distribution channels 210 have a uniform cross section moving through the stack in the stack direction and do not taper. Tapering geometries may be used, but the benefits of tapering geometries may not be as important for adhesive applications, because precise uniformity of melt blowing product is often not as important for adhesive applications as for nonwoven applications.

Figure 7:
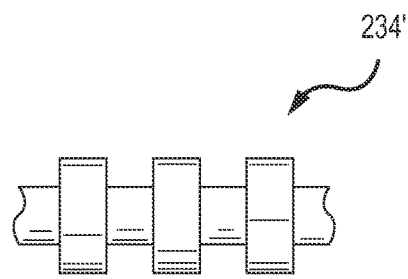
FIG. 7 shows an example of a valve unit that may be used with the example stack of plates of FIG. 5.
Figure 8:
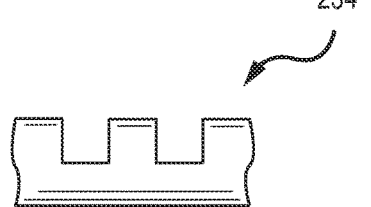
FIG. 8 shows another example of a valve unit that may be used with the example stack of plates of FIG. 5.

FIG. 7 shows in greater detail one example embodiment for a valve unit 234' configuration with a spool valve design that may be used for the valve unit 234 of FIG. 5 to control polymer flow to extrusion orifices 204. As shown in FIG. 8, the valve unit 234' includes multiple disks, or spools, spaced along the valve unit 234' to correspond with the spacing of occurrences of the valve cavities 230, in the polymer passages 212. The valve unit 234' may be moved between open and closed positions to open and close off the corresponding polymer passages 212 to polymer flow by translating the valve unit 234' in a direction into or out of the stack 200 (advancing or retracting the valve unit) by pulling or pushing the valve unit 234' to seat or unseat the spools in the corresponding valve cavities 230 to un-block or to block the polymer passages 212 to permit or not permit polymer flow through the polymer passages 212 to the corresponding extrusion orifices 204. Similarly designed valve units may be used to control gas flow through gas passages 214 in a similar manner.

FIG. 8 shows another example embodiment for a valve unit 234" configuration with a rotary valve design that may be used for the valve unit 234 of FIG. 5. The valve unit 234" includes spaced recess areas corresponding with spacing of the valve cavities 230 of the polymer passages 212, such that the valve unit 234" is rotatable 90° to reposition the recess areas in the valve cavities 230 between the open and closed positions to permit or not permit polymer flow through the recess areas and through the polymer passages 212 to the corresponding extrusion orifices 204. Similarly designed valve units could be used to control gas flow through gas passages 214 in a similar manner.

Figure 11:
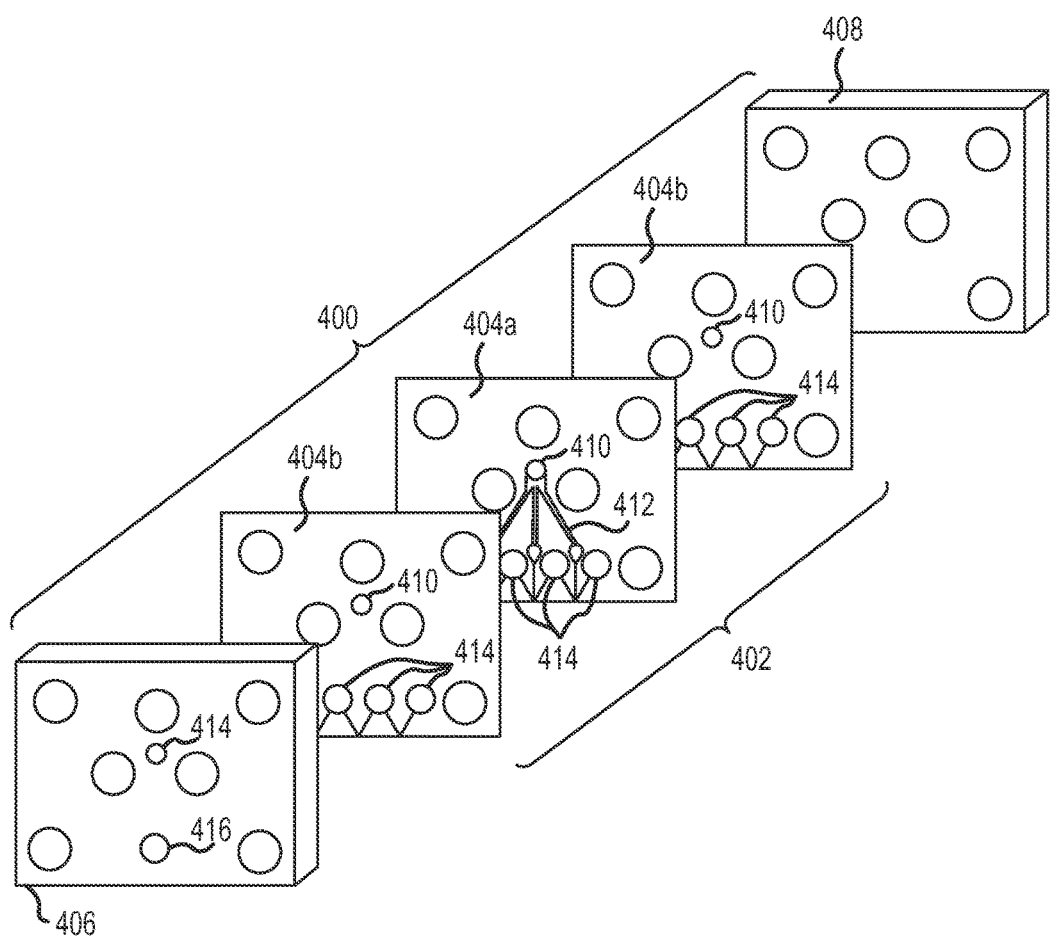
FIG. 11 illustrates another example melt blowing die including a stack of plates.

Referring now to FIG. 11, another example embodiment is shown of a melt blowing die assembly 400 including a stack 402 of plates 404 disposed between a first end unit 406 and a second end unit 408. For illustration purposes only three representative plates 404 are shown for the stack of plates 402, even though an actual stack may include many such plates. The stack 402 includes three rows of polymer extrusion orifices with two rows of gas openings corresponding with each row of extrusion orifices. Extrusion orifices for all three rows are fed polymer from a single polymer distribution channel 410 that is in fluid communication through polymer passages 412 with all of the polymer extrusion orifices of all three rows of extrusion orifices. Distribution to gas openings is through gas distribution channels 414 extending through the stack 402. Four gas distribution channels 412 each distribute gas to six rows of gas openings, with two of the gas distribution channels 412 each feeding gas to two rows of gas openings and two of the gas distribution channels 412, at the ends, each providing gas to only one row of gas openings. The plates 404 of the stack 402 are of two different configurations. A first configuration 404b includes features for the polymer extrusion orifices and polymer passages 412 from the polymer distribution channel 410 to the extrusion orifices. The second plate configuration 404b is disposed between a pair of plates 404a of a second configuration that does not include geometries for polymer passages or polymer orifices, but rather provides boundaries for such features. Both plate configurations include features for gas openings and gas passages from the gas distribution channels 414 to the gas openings.

The melt blowing die assembly 400 includes a single polymer inlet 414 on the first end unit 406 that provides polymer feed to the single polymer distribution channel 410 in the stack 402. The first end unit 406 also includes a single gas inlet 416 and a gas manifold (not shown) that distributes gas fed through the gas inlet 416 to all of the gas distribution channels 414. The second end unit 408 closes off and seals the distal ends of the polymer distribution channel 410 and the gas distribution channels 414. Other passages are provided through the melt blowing die assembly 400 for connectors (e.g., bolts) to hold the assembly together and for heating elements.

Reference is made to FIGS. 12-15 illustrating some example embodiments of melt blowing dies including one or more stack of plates between end units. As will be appreciated, not all features of a stack or end unit are shown in FIGS. 12-15. For example, individual plates in a stack are not delineated, and features such as retention bolts (or other connectors) to hold an assembly together, heating elements, sensor probes, valve units, solenoids or other features that may be present are not shown.

Figure 12:
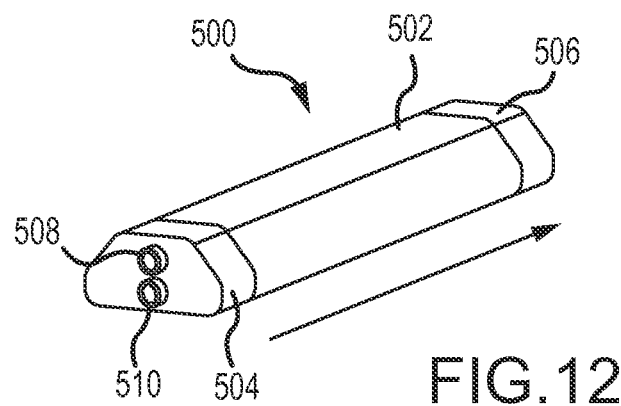
FIG. 12 illustrates another example of a melt blowing die including a stack of plates.

Referring to FIG. 12, an example embodiment of a melt blowing die 500 is shown including a single stack of plates 502 disposed between two end units 504 and 506. End unit 504 includes a single polymer inlet 508 and a single gas inlet 510. Polymer may be fed to the die 500 through the polymer inlet 508. The polymer inlet 508 is in fluid communication with one or more polymer distribution channels extending in the stack direction through the stack 502 to distribute polymer to one or more rows of polymer extrusion orifices in the stack 502 extending in the stack direction. Likewise, gas may be fed to the die 500 through the gas inlet 500 to be distributed to all gas distribution channels within the stack 502 to provide gas to all rows of gas outlets in the stack 502 extending in the stack direction. The arrow shown in FIG. 12 illustrates the general direction of polymer flow longitudinally from the proximal longitudinal end of the stack 502 adjacent the end unit 504 toward the distal longitudinal end of the stack 502 adjacent the end unit 506.

Figure 13:
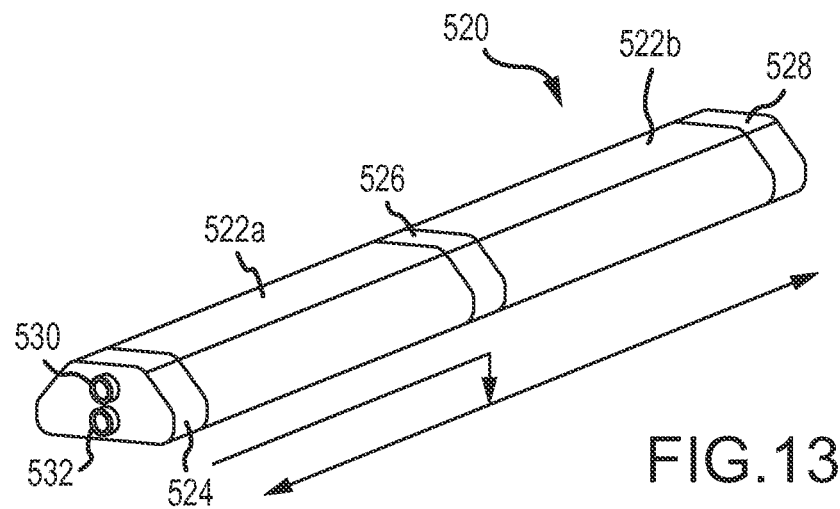
FIG. 13 illustrates an example melt blowing die including two stacks of plates.

Referring now to FIG. 13 another example embodiment of a melt blowing die 520 is shown that includes two stacks 522a,b of plates and three end units 524, 526 and 528. The end unit 526 is referred to as an "end unit" even though is disposed between the two stacks of plates 522a, 522b, because it provides an end function to one or both of the stacks 522a and 522b. The end unit 526 may be referred to as an intermediate end unit because it is disposed in an intermediate position in a melt blowing die between two stacks of plates. In the die 520 shown in FIG. 12, polymer may be fed to the die 520 through a single polymer inlet 530 of the end unit 524. The die 520 includes an internal manifold arrangement that distributes polymer from the polymer inlet 530 to both of the stacks 522a and 522b. The internal polymer manifold arrangement includes a passage that passes through the first stack 522a and into the intermediate end unit 526, and polymer is then distributed from the intermediate end unit 526 into both of the stacks 522a and 522b. The stacks 522a and 522b are arranged in opposing relation with opposing open longitudinal ends of polymer distribution channels facing and opening into open the intermediate end unit 526, whereby polymer feed is introduced from the intermediate and unit 526 into the polymer distribution channels of both stacks 522a and 522b. Polymer then flows through each polymer distribution channel in the stack 522a toward the end unit 524 and polymer flows through each polymer distribution channel in the stack 522b toward the end unit 528. The general overall polymer distribution internally to the end unit 526 and through the polymer distribution channels of the stacks 522a and 522b is shown by the arrows in FIG. 13. This type of internal polymer manifolding provides an equal length polymer flow path from the polymer inlet 530 to the feed ends (proximal ends) of the stacks 522a and 522b with polymer distribution channels that open into the intermediate end unit 526. The die 520 includes a single gas inlet 532, and may include an internal manifold arrangement through the die to provide gas to gas distribution channels of each of the stacks 522a and 522b through the intermediate end unit 526 in a manner similar to that described for polymer flow. As will be appreciated, any of the end units 524, 526 and 528 may be a single-piece structure (e.g., a single machined piece) or may be comprised of multiple pieces, which may be or include an assembly of a stack of plates separate from the stacks 522a,b. For example, the intermediate end unit 526 may include a stack of multiple plates providing polymer extrusion orifices and gas openings in rows that correspond with rows of extrusion orifices and gas openings in the stacks 522a,b. Such extrusion orifices and gas openings in the intermediate end unit 526 may, together with extrusion orifices and gas openings in the stacks 522a,b, provide continuity of polymer extrusion orifices and gas openings over the full length of the die 520 between the proximal end unit 524 and the distal end unit 528 (i.e., over the full length of the stacks 522a,b and the intermediate end unit 526).

Figure 14:
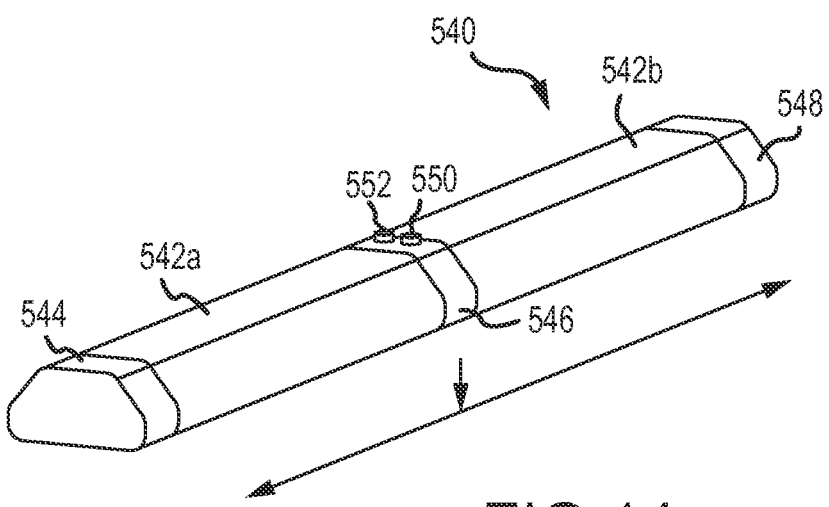
FIG. 14 illustrates another example melt blowing die including two stacks of plates.

FIG. 14 shows another example embodiment of a melt blowing die 540 including two stacks 542a,b and three end units 544, 546 and 548. The design of the die 540 shown in FIG. 13 may generally be the same as for the die 520 shown in FIG. 13, except that polymer and gas feed are through a polymer inlet 550 and gas inlet 552 feeding directly into the intermediate end unit 546 rather than through an end unit disposed at a longitudinal end of the die 540. The general overall polymer distribution internally within the die 540 to and through polymer distribution channels in the stacks 522a,b is shown by the arrows depicted in FIG. 14, which may include equal length flow paths for polymer feed from the polymer inlet 550 to polymer distribution channels of all of the stacks 542a,b. Gas flow through the die 540 may be distributed to gas distribution channels in the stacks 542a,b through an internal gas flow manifold arrangement similar to that described for polymer flow.

Figure 15:
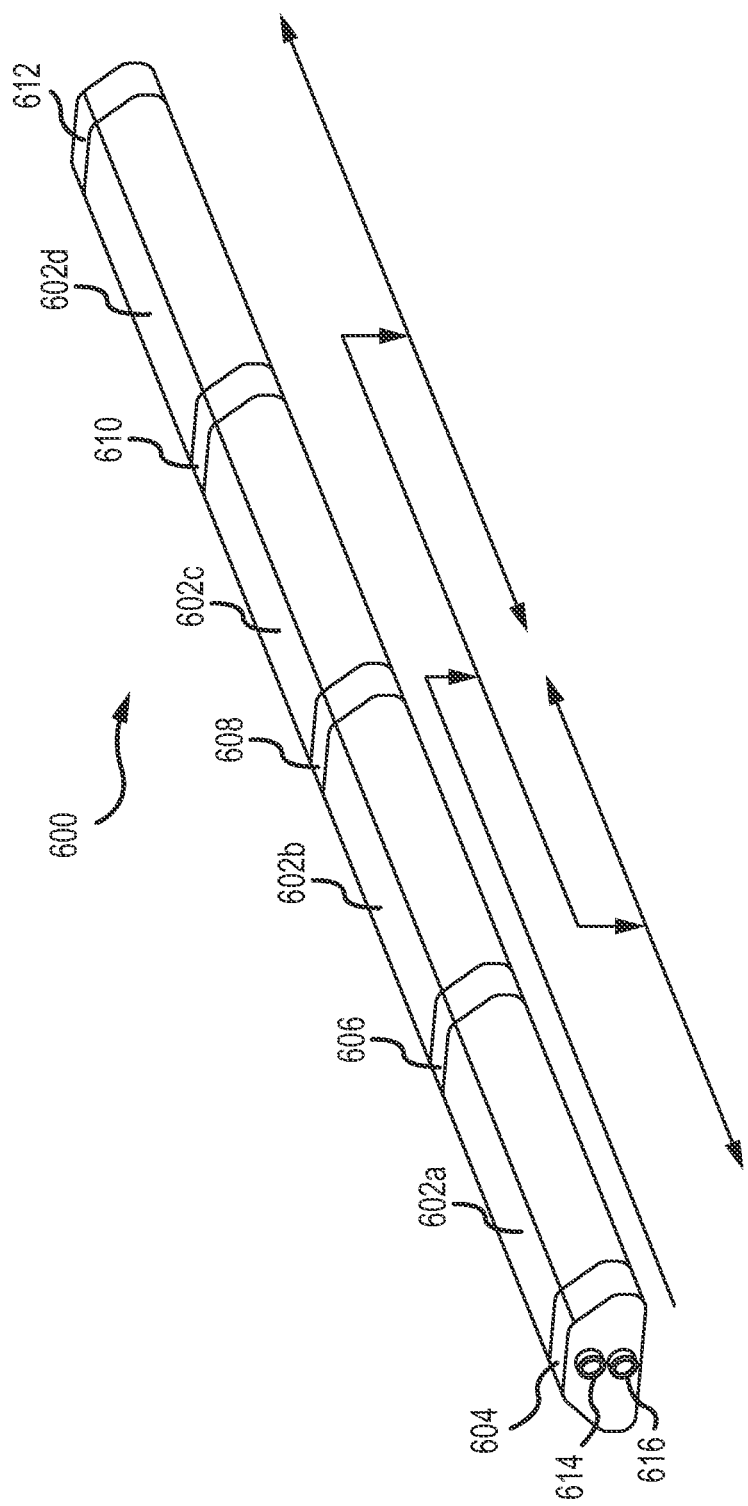
FIG. 15 illustrates another example melt blowing die including four stacks of plates.

Reference is now made to FIG. 15 showing yet another example embodiment of a melt blowing die 600 that includes four stacks 602a-d of plates and five end units 604, 606, 608, 610 and 612. A single polymer inlet 614 and a single gas inlet 616 are provided in the end unit 604. The die 600 includes an internal polymer manifold system including a polymer passage from the polymer inlet 614 through the first stack 602a, through the intermediate end unit 606 and through the second stack 602b to the intermediate end unit 608. The internal polymer manifold system further includes polymer passages from the intermediate end unit 608 through the third stack 602c to the intermediate end unit 610 and in an opposing direction through the second stack 602b to the intermediate end unit 606. Polymer is then distributed from the intermediate end unit 606 into the polymer distribution channels of the first stack 602a and the second stack 602b in opposing flow directions and polymer is distributed from the intermediate end until 610 into the polymer distribution channels of the third stack 602c and the fourth stack 602d in opposing flow directions. The general overall polymer distribution internally within the die 600 is shown by the arrows depicted in FIG. 15, again providing for equal length flow paths for polymer to feed ends of each of the stacks 602a-d. Similar to the discussion for FIG. 13, the intermediate end units 606, 608 and 610 may have polymer extrusion orifices and gas openings to provide continuity with rows of extrusion orifices and gas openings in the stack, 602a-d. Similar internal manifolding may also be provided for gas flow from the gas inlet 616 to gas distribution channels in each of the stacks 602a-d.

The unit-based construction of dies made possible by use of one or multiple similarly configured stacks of plates with polymer feed through end units provides great flexibility to provide melt blowing dies of varying lengths for different applications, depending upon the length of the individual stacks arranged in series to provide longitudinal length to the die. For example, if a stack is designed with a length of 1 meter, a melt blowing die of approximately 2 meters long may be prepared using two of the stacks and a melt blowing die of approximately 4 meters long may be made using four of the stacks. It should be appreciated, however, that stacks of any length and any number of stacks may be used in a melt-blowing die. For example, a melt blowing die could include, 2, 3, 4 or more than 4 such stacks. It should also be appreciated that when the melt blowing die includes internal manifolding to multiple stacks from a common polymer inlet or gas inlet, that the plates of the different stacks may have different features associated with providing the desired manifolding.

Figure 16:
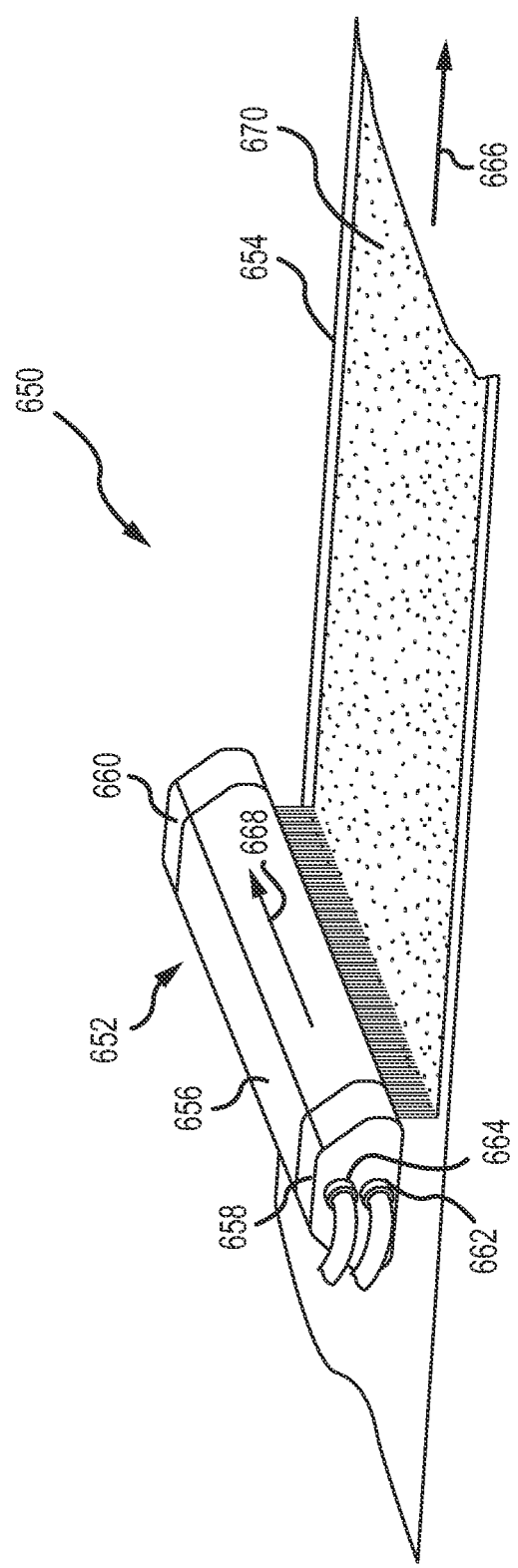
FIG. 16 illustrates an example melt blowing apparatus and operation of the melt blowing apparatus to prepare a nonwoven structure.

Reference is now made to FIG. 16 showing an example embodiment of a melt blowing apparatus 650 that includes a melt blowing die 652 and a collection substrate 654, in the form of a belt or web. For illustration purposes the melt blowing die 652 includes a single stack 656 of plates disposed between two end units 658 and 660, although a die with multiple stacks could as easily be used. The die 652 includes a single polymer inlet 662 and a single gas inlet 664. The collection substrate 654 is positioned relative to polymer extrusion orifices of the die 652 and is moveable relative to the die 652 in a machine direction 666 to collect attenuated polymer filaments or fibers, produced by the die 652 during a melt blowing operation. As shown in FIG. 15, the stack direction 668 of the stack 656 is transverse to the machine direction 666. The melt-blowing apparatus 650 is shown in operation with attenuated polymer filaments produced by the melt blowing die 652 being collected as a nonwoven structure 670 on the moving collection substrate 654.

Figure 17:
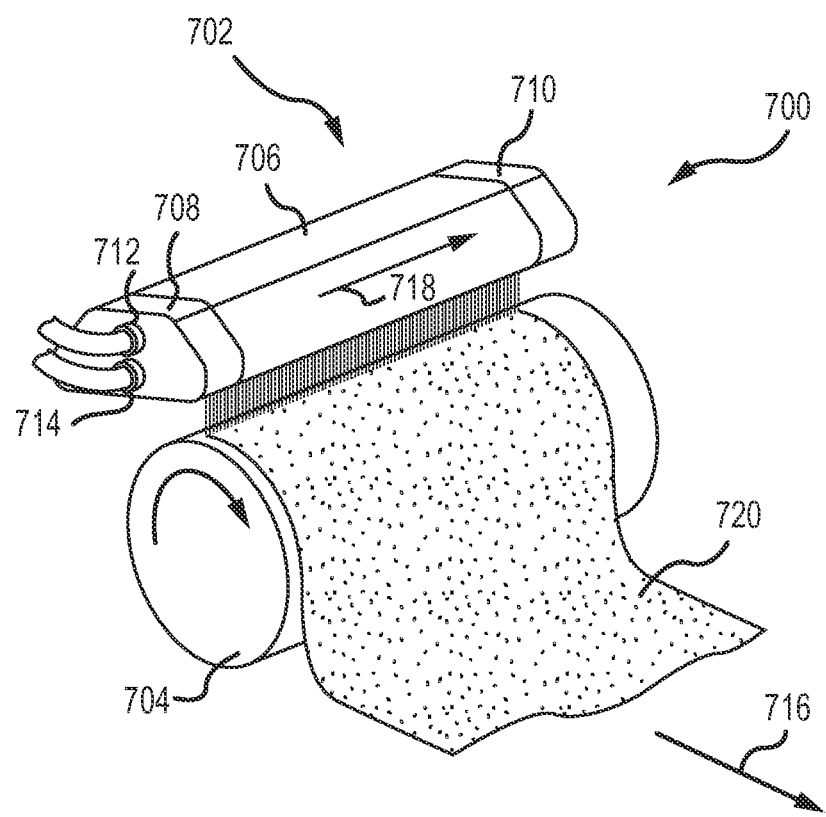
FIG. 17 illustrates another example melt blowing apparatus and operation of the melt blowing apparatus to prepare a nonwoven structure.

Reference is now made to FIG. 17 that shows another example embodiment of a melt blowing apparatus 700. The melt blowing apparatus 700 includes a melt blowing die 702 and a collection substrate 704 in the form of a rotating drum, which is rotatable relative to the die 702 as shown by the rotational direction arrow in FIG. 16. For illustration purpose the melt blowing die 702 includes a single stack 706 of plates disposed between two end units 708 and 710, although a die with multiple stacks could as easily be used. The melt blowing die 702 includes a single polymer inlet 712 and a single gas inlet 714 on the end unit 708. The melt blowing apparatus 700 is shown in operation making a nonwoven structure 720 that moves in a machine direction 716 that is traverse to the stack direction 718 of the stack 706.

Figure 18:
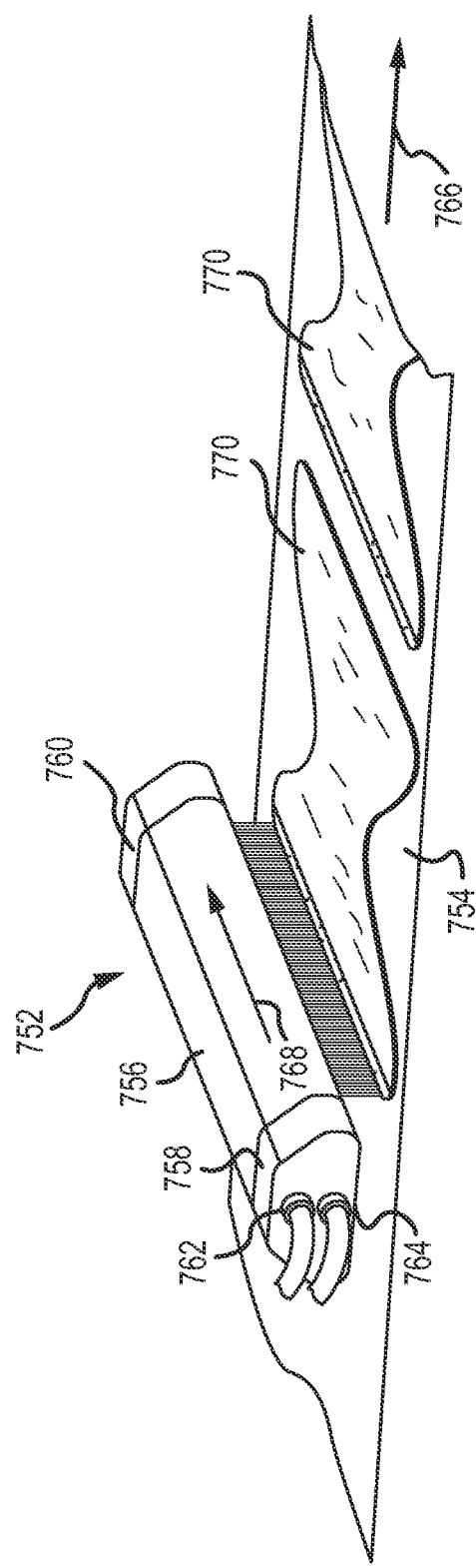
FIG. 18 illustrates another example melt blowing apparatus and operation of the melt blowing apparatus to deposit adhesive on manufacturing work pieces.

Reference is now made to FIG. 18 showing yet another example embodiment of a melt blowing apparatus 750. The melt blowing apparatus 750 includes a melt blowing die 752 and a collection substrate 754 in the form of belt or web. For illustration purposes, melt blowing die 752 is shown with a single stack 756 of plates disposed between two end units 758 and 760, although a die unit with multiple stacks could as easily be used. The melt blowing die 752 includes a single polymer inlet 762 and a single gas inlet 764 on the end unit 758. The melt blowing apparatus 750 is shown in operation for applying adhesive to work pieces 770 in the form of unfinished diapers supported on the collection substrate 754 moving in a machine direction 766 that is transverse to the stack direction 768 of the stack 756. As illustrated in FIG. 18, the work pieces provide a working substrate in the form of a piece with surfaces to be adhered to another piece (not shown) during manufacture of diaper products.

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible implementations and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Furthermore, any feature described or claimed with respect to any disclosed implementation may be combined in any combination with one or more of any other features of any other implementation or implementations, to the extent that the features are not necessarily technically compatible, and all such combinations are within the scope of the present disclosure.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all.

What is claimed is:

1. A melt blowing die, comprising:
  at least one stack of plates stacked in a stack direction, the stack of plates comprising:
    polymer filament extrusion orifices including at least one row of extrusion orifices extending in the stack direction across multiple said plates of the stack;
    a gas distribution system within the stack including gas outlets positioned to provide distributed gas flow to contact and attenuate polymer filaments extruded from the said extrusion orifices of each said row of extrusion orifices; and
    at least one polymer distribution channel extending longitudinally through multiple said plates in the stack direction, the polymer distribution channel being in fluid communication within the plate stack for supply of polymer to the extrusion orifices of at least one said row of extrusion orifices; and
  the polymer distribution channel is open to receive polymer feed only at a longitudinal end of the polymer distribution channel.

2. A melt blowing die according to claim 1, wherein:
  each said extrusion orifice of a said row of extrusion orifices is in fluid communication with the polymer distribution channel through a separate polymer passage having a polymer valve mechanism disposed therein that is manipulable between an open position and a closed position to permit and prevent polymer flow through the polymer passage to the corresponding said extrusion orifice;

all said polymer valve mechanisms corresponding with a said row of extrusion orifices are in a row extending in the stack direction; and all said polymer valve mechanisms corresponding with a said row of extrusion orifices are connected with an actuation member that is manipulable to simultaneously reposition all said polymer valve mechanisms corresponding with the row of extrusion orifices between the open and closed positions.

3. A melt blowing die according to claim 2, wherein the actuation member is longitudinally translatable to simultaneously reposition between the open and closed positions all said polymer valve mechanisms corresponding with a said row of extrusion orifices.

4. A melt blowing die according to claim 2, wherein the actuation member is rotatable to simultaneously reposition between the open and closed positions all said polymer valve mechanisms corresponding with the row of extrusion orifices.

5. A melt blowing die according to claim 2, wherein the stack comprises at least two said rows of extrusion orifices; and each said row of extrusion orifices corresponds with a separate row of said polymer valve mechanisms; and each said row of polymer valve mechanisms is connected with a separate said actuation member.

6. A melt blowing die according to claim 1, wherein each said polymer distribution channel has a cross-section transverse to the stack direction that tapers in the stack direction moving away from a said longitudinal end open to receive polymer feed.

7. A melt blowing die according to claim 6, wherein each said polymer distribution channel extends longitudinally through at least 10 said plates in the stack direction and over a length of the stack in the stack direction of at least 1 centimeter.

8. A melt blowing die according to claim 7, wherein each said row of extrusion orifices includes at least 100 of the extrusion orifices.

9. A melt blowing die according to claim 6, wherein each said extrusion orifice in each said row of extrusion orifices has a maximum cross-dimension in a range of from 0.05 to 0.35 millimeter.

10. A melt blowing die according to claim 9, wherein the extrusion orifices in the row of extrusion orifices have a center-to-center spacing in a range of from 0.05 to 1.5 millimeters.

11. A melt blowing die according to claim 10 wherein the stack includes:

at least 35 of the said extrusion orifices per centimeter of length of the stack in the stack direction; and at least 6 of the plates per centimeter of length of the stack in the stack direction.

12. A melt blowing die according to claim 6, comprising only a single polymer feed inlet.

13. A melt blowing die according to claim 12, comprising:

at least two of said stacks of plates;

a polymer feed manifold system internal to the melt blowing die in fluid communication to provide polymer feed to each said stack, the polymer manifold system passes through at least a plurality of the plates of at least one said stack; and the polymer manifold system includes a polymer feed path to each said stack that is of equal length from the polymer feed inlet.

14. A melt blowing die according to claim 6, wherein each said polymer distribution channel has a tapering shape to provide equal residence time for polymer flow through the polymer distribution channel and to each of the said extrusion orifices of each said row of extrusion orifices in fluid communication with the said polymer distribution channel.

15. A melt blowing die according to claim 6, wherein the cross-section of each said polymer distribution channel becomes progressively smaller each said plate in succession in the stack direction through which the said polymer distribution channel extends.

16. A melt blowing die according to claim 6, wherein:

each said polymer distribution channel extends longitudinally through at least 100 said plates in the stack direction and over a length of the stack in the stack direction of at least 1 centimeter;

each said row of extrusion orifices includes at least 100 of the extrusion orifices;

each said extrusion orifice in each said row of extrusion orifices has a maximum cross-dimension in a range of from 0.05 to 0.35 millimeter;

the extrusion orifices in the row of extrusion orifices have a center-to-center spacing in a range of from 0.05 to 1.5 millimeters; and the stack includes at least 35 of the said extrusion orifices per centimeter of length of the stack in the stack direction.

17. A melt blowing die according to claim 16, comprising at least two said polymer distribution channels wherein each said polymer distribution channel is in fluid communication with a different said row of extrusion orifices.

18. A melt blowing die according to claim 17, wherein each said polymer distribution channel is in fluid communication with only a single said row of extrusion orifices.

19. A melt blowing die according to claim 17, wherein the stack includes a ratio of number of the said extrusion orifices in the stack to number of the plates in the stack of at least 1.5:1.

20. A method for producing fiber-containing materials, the method comprising:

feeding a polymer feed to the melt blowing die according to claim 16;

distributing different portions of the polymer feed to the extrusion orifices of the melt blowing die;

extruding polymer filaments from the said extrusion orifices; and attenuating extruded polymer filaments from the said extrusion orifices with gas flow from the gas outlet openings of the melt blowing die directed to contact the extruded polymer filaments from the extrusion orifices;

wherein the distributing comprises introducing at least a portion of the polymer feed into each said polymer distribution channel only through a said longitudinal end of each said polymer distribution channel.

21. A melt blowing die according to claim 6, wherein:

the gas distribution system comprises at least one row of gas openings associated with each said row of extrusion orifices;

the gas distribution system comprises a gas distribution channel extending longitudinally through multiple said plates of the stack in the stack direction, the gas distribution channel being in fluid communication within the plate stack with at least one said row of gas outlet openings to supply gas to the gas outlet openings of the at least one said row of gas outlet openings; and each said gas distribution channel is open to receive gas feed only at a longitudinal end of the gas distribution channel.

22. A melt blowing die according to claim 21, wherein each said gas distribution channel has a cross-section transverse to the stack direction that tapers in the stack direction moving away from a said longitudinal end of the gas distribution channel that is open to receive gas feed.

23. A melt blowing die according to claim 21, wherein:
each said gas opening of a said row of gas openings is in fluid communication with the gas distribution channel through a separate gas passage having a gas valve mechanism disposed therein that is manipulable between an open position and a closed position to permit and prevent air flow through the air passage to the corresponding said gas opening.

24. A melt blowing die according to claim 23, wherein all said gas valve mechanisms corresponding with a said row of gas openings are in a row extending in the stack direction.

25. A melt blowing die according to claim 24, wherein all said gas valve mechanisms corresponding with a said row of gas openings are connected with a gas valve actuation member that is manipulable to simultaneously reposition all said gas valve mechanisms corresponding with the row of gas openings between the open and closed positions.

26. A melt blowing die according to claim 25, wherein the stack comprises at least two said rows of gas openings;
each said row of gas openings corresponds with a separate row of said gas valve mechanisms; and
each said row of gas valve mechanisms is connected with a separate said gas valve actuation member.

27. A melt blowing die according to claim 6, wherein a said polymer distribution channel is open at only a second longitudinal end of the said polymer distribution channel to receive polymer feed, and the melt blowing die comprises:
a first end unit disposed adjacent a first longitudinal end of the stack and closing the said polymer distribution channel at a first longitudinal end of the said polymer distribution channel opposite the second longitudinal end that is open to receive polymer feed; and
a second end unit disposed adjacent a second longitudinal end of the stack at which a second longitudinal end of each said polymer distribution channel is open to receive polymer feed, wherein the second end unit includes a polymer feed port in fluid communication with each said polymer distribution channel of the stack to supply polymer feed to each said polymer distribution channel.

28. A melt blowing die according to claim 6, including a die unit comprising:
two of said stacks of plates, wherein the polymer distribution channels of the different ones of the two said stacks are positioned with the longitudinal ends of the different ones of the two stacks open to receive polymer feed in opposing relation; and
a single polymer feed port to provide polymer feed to said longitudinal ends open to receive polymer feed of the polymer distribution channels of both of the two said stacks of plates.

29. A melt blowing apparatus, comprising:
the melt blowing die of claim 6; and
a collection substrate positioned relative to the said extrusion orifices and movable relative to the melt blowing die in a machine direction to collect attenuated polymer fibers produced from the melt blowing die;
wherein, the stack direction is transverse to the machine direction.

30. A method for producing fiber-containing materials, the method comprising:
feeding a polymer feed to the melt blowing die according to claim 1;
distributing different portions of the polymer feed to the extrusion orifices of the melt blowing die;
extruding polymer filaments from the said extrusion orifices; and
attenuating extruded polymer filaments from the said extrusion orifices with gas flow from the gas outlet openings of the melt blowing die directed to contact the extruded polymer filaments from the extrusion orifices;
wherein the distributing comprises introducing at least a portion of the polymer feed into each said polymer distribution channel only through a said longitudinal end of each said polymer distribution channel.

31. A method according to claim 30, wherein a pair of said stacks are oriented in opposing relation with open longitudinal ends of the said polymer distribution channels of the stacks of the pair facing each other; and
the distributing comprises supplying polymer from a single polymer feed port into a space between the stacks of the pair for distribution of portions of the polymer feed to the polymer distribution channels of the stacks of the pair.

32. A method according to claim 30, wherein:
each said extrusion orifice or each said row of extrusion orifices receives polymer during the extruding through a separate polymer passage in the stack to that extrusion orifice, each said polymer passage including a polymer valve mechanism that is manipulable between an open position to permit polymer flow through the polymer passage to a corresponding said extrusion orifice and a closed position to prevent polymer flow through the polymer passage the corresponding said extrusion orifice;
during the extruding said polymer valve mechanisms are in the open position; and
the method comprises periodically temporarily interrupting the extruding, comprising periodically manipulating the polymer valve mechanisms from the open position to the closed position and back to the open position;
for each said row of extrusion orifices there is a row of polymer valve mechanisms corresponding with the extrusion orifices of the said row of extrusion orifices and all polymer valve mechanisms of a row of polymer valve mechanisms are connected with a polymer valve actuation member; and
the periodically temporarily interrupting the extruding comprises manipulating the polymer valve member to simultaneously reposition the polymer valve mechanisms between the open position and the closed position.

33. A method according to claim 30, comprising collecting attenuated polymer filaments from the attenuating on a substrate moving in a machine direction relative to the melt blowing die, wherein the stack direction is transverse to the machine direction.

* * * * *